US007539828B2

(12) United States Patent
Lomnes

(10) Patent No.: US 7,539,828 B2
(45) Date of Patent: May 26, 2009

(54) METHOD AND SYSTEM FOR AUTOMATICALLY PRESERVING PERSISTENT STORAGE

(75) Inventor: Randy Keith Lomnes, Coquitlam (CA)

(73) Assignee: Faronics Corporation, Vancouver (CA)

( * ) Notice: Subject to any disclaimer, the term of this patent is extended or adjusted under 35 U.S.C. 154(b) by 552 days.

(21) Appl. No.: 09/923,727

(22) Filed: Aug. 6, 2001

(65) Prior Publication Data

US 2002/0023225 A1 Feb. 21, 2002

Related U.S. Application Data

(60) Provisional application No. 60/223,829, filed on Aug. 8, 2000.

(51) Int. Cl.
*G06F 12/00* (2006.01)
*G06F 13/00* (2006.01)
*G06F 13/28* (2006.01)
(52) U.S. Cl. ..................................... 711/163
(58) Field of Classification Search ................. 713/200; 711/163
See application file for complete search history.

(56) References Cited

U.S. PATENT DOCUMENTS 3,827,029 A * 7/1974 Schlotterer et al. .......... 711/163

(Continued)

FOREIGN PATENT DOCUMENTS

EP 0 516 682 B1 6/1995

(Continued)

OTHER PUBLICATIONS

"Windows Driver Model (WDM) Compatible drivers for Microsoft Windows operating systems," URL=http://www.microsoft.com/whdc/archive/wdmoverview.mspx, Apr. 15, 2002, 5 pages, download date Jan. 14, 2009.

(Continued)

*Primary Examiner*—Sheng-Jen Tsai
(74) *Attorney, Agent, or Firm*—Seed IP Law Group PLLC

(57) ABSTRACT

Computer-based methods and systems for automatically protecting a storage device from unwanted alterations are provided. Example embodiments provide a Disk Access Redirection System, which includes a Redirection Driver, an Available Space Table ("AST"), a Protected Space Redirection Table ("PSRT"), and optionally an Unprotected Space Table ("UST"). The Redirection Driver is installed and registered with the computer operating system so that it can intercept storage device access requests (such as a disk read/write). When a storage access request for a read or a write is sent, the request is intercepted by the Redirection Driver, transparent to the code that invokes the storage access request. Upon intercepting a write request, the Redirection Driver determines whether the target location is protected (using the PSRT and UST). If so, the Redirection Driver writes to a redirected data area, allocating more space to the redirected data area as needed. Upon intercepting a read request, the Redirection Driver determines whether to read data from the specified source location or whether to translate the request to read data from the redirected data area to which the source location has been previously redirected. The Redirection Driver uses the AST, PSRT, and optionally the UST, to allocate available storage space for redirected write requests, redirect write requests for protected areas of the storage device, and redirect read requests when the read request specifies a storage location that has been previously redirected. A Redirection Driver can be implemented to intercept storage access requests at different levels of storage access, including files, clusters, logical sectors, physical sectors, or at any defined data abstraction level. When the computer system is shut down, the redirected data area is discarded, thereby automatically reinstating the original state of the storage device when the computer is rebooted.

80 Claims, 16 Drawing Sheets

U.S. PATENT DOCUMENTS

| | | | |
|---|---|---|---|
| 3,828,327 A * | 8/1974 | Berglund et al. | 710/264 |
| 5,144,660 A * | 9/1992 | Rose | 713/200 |
| 5,193,184 A * | 3/1993 | Belsan et al. | 711/4 |
| 5,363,334 A * | 11/1994 | Alexander et al. | 365/185.04 |
| 5,367,658 A * | 11/1994 | Spear et al. | 711/163 |
| 5,437,018 A * | 7/1995 | Kobayashi et al. | 713/2 |
| 5,552,776 A * | 9/1996 | Wade et al. | 340/5.74 |
| 5,559,993 A * | 9/1996 | Elliott et al. | 711/163 |
| 5,603,011 A * | 2/1997 | Piazza | 711/170 |
| 5,657,473 A | 8/1997 | Killean et al. | 395/490 |
| 5,829,012 A * | 10/1998 | Marlan et al. | 711/102 |
| 5,832,263 A * | 11/1998 | Hansen et al. | 719/322 |
| 5,848,435 A * | 12/1998 | Brant et al. | 711/152 |
| 5,940,850 A * | 8/1999 | Harish et al. | 711/102 |
| 6,016,553 A * | 1/2000 | Schneider et al. | 714/21 |
| 6,092,161 A * | 7/2000 | White et al. | 711/163 |
| 6,526,488 B1 | 2/2003 | White et al. | 711/163 |
| 6,684,309 B2 | 1/2004 | White et al. | 711/163 |

FOREIGN PATENT DOCUMENTS

| | | |
|---|---|---|
| EP | 0 800 135 A1 | 10/1997 |
| JP | 1173311 | 10/1989 |

OTHER PUBLICATIONS

Silberschatz et al., "Operating System Concepts," Addison-Wesley Publishing Company, New York, 1994, 8 pages.

* cited by examiner

METHOD AND SYSTEM FOR AUTOMATICALLY PRESERVING PERSISTENT STORAGE

CROSS-REFERENCE TO RELATED APPLICATION

This application claims the benefit of U.S. Provisional Patent Application No. 60/223,829 filed Aug. 8, 2000, which is incorporated herein by reference in its entirety.

BACKGROUND OF THE INVENTION

1. Field of the Invention

The present invention relates to a method and system for protecting a computer system, and, in particular, to methods and systems for providing a storage redirection driver that protects the storage devices of a computer system from alteration.

2. Background

Often times it is desirable to insure that a computer workstation remains unaltered, even though it is being used by a multitude of users in potentially varied and unknown ways. For example, in public environments such as schools, libraries, and other community facilities, access to a group of computer systems is highly desired, for example, to conduct research, use common resources of a company, or to learn and try new programs. Typically, these environments can be characterized as having "uncontrolled access," because the moment by moment usage of the computer systems is not monitored.

In such situations, it is highly desirable to insure that users can utilize the functionality of the computer system but not be allowed to "corrupt" the persistent storage of the system, so that follow-on users will find the system in a pristine state. One mechanism for preventing such corruption is to make a copy of the pristine state of the computer system desired and to restore the copy prior to shutdown of the system by each user. One difficulty with such an approach is that it is often difficult in operating system environments to capture the hardware on/off switch, and so, when a user cycles power without a proper operating system shutdown, the system is unable to successfully restore the pristine state.

Some systems have used special hardware cards to perform the copying. For example, one such system copies the pristine state of the disk storage device into a special disk partition before use access is permitted. Data from the special disk partition is then copied back (restored) upon computer system shut down.

In database environments, other techniques have been used. Typically, for example, the database changes (in opposite order) are "undone" to the storage device to return it to a pristine state. This technique also suffers from failure in the cycle power situation.

SUMMARY OF THE INVENTION

Embodiments of the present invention provide methods and systems for automatically preserving an original state of a computer system upon rebooting. Example embodiments provide a Disk Access Redirection System (the "DARS") to allow all or portions of a storage device to be protected from modification. The DARS can protect such storage devices as disk drives, and other persistent and semi-persistent storage devices. The DARS reads data from and writes data to a redirected data area (a redirected space) when a storage access request is received that would otherwise alter the state of an area of the storage device that has been designated as protected. When the computer system is shut down, the redirected data area is discarded; thus, when the computer system is rebooted, the original state of the protected portions if the storage device are automatically restored, without the need to copy any information from a backup area.

In one embodiment, the DARS comprises a Redirection Driver, and several redirection tables, including an Available Space Table ("AST"), a Protected Space Redirection Table ("PSRT"), and, when unprotected areas can be designated, an Unprotected Space Table ("UST"). The AST indicates available space of a storage device and is used to allocate space as redirected space. The PSRT indicates the mappings of protected locations on the storage device to locations in the redirected space. The UST indicates unprotected locations of the storage device. In some embodiments, one or more entire storage devices can be designated as protected. In other embodiments, portions of a storage device can be designated as protected and other portions designated as unprotected. The DARS differentiates between protected and unprotected storage areas, redirecting storage write requests to a redirected data area when a storage area has been designated as protected.

In one embodiment, the protection level for the DARS is configurable. For example, the protection level may be configured as all storage is protected, portions of storage (at the device level or within a device) are protected, or no storage is protected. Variations of these combinations are also configurable.

In some embodiments, when a portion of storage is indicated as unprotected, it is written to directly by the appropriate storage driver. In other embodiments, the Redirection Driver redirects storage access requests to unprotected areas, and integrates them into the unprotected portion of storage upon computer system shut down, or upon reboot.

In one embodiment, the Redirection Driver translates an original location in a storage access request to a redirected storage location and forwards a revised storage access request to the storage driver to perform the storage access. In another embodiment, the Redirection Driver performs the actual access itself.

In yet another embodiment, the Redirection Driver can redirect data at different driver access levels. For example, the Redirection Drive can direct data at a file level, a cluster level, a logical sector level, or a physical sector level. Combinations of redirecting data at different levels are also provided. In addition, a Redirection Driver that operates using virtual clusters (or any data abstraction that can be implemented as any size object for storing data) can be used with the DARS. In this embodiment, available space objects are provided that implement the mapping between virtual clusters and the actual size of the space in the redirected area. Virtual cluster embodiments provide extensibility across operating systems and different storage devices.

In one embodiment that supports a layered driver architecture, the Redirection Driver is inserted into a chain of native operating system drivers and registered with the operating system. When a storage access request is made, the appropriate driver in the chain is invoked by the operating system. In this manner, the Redirection Driver intercepts storage access requests. In some such embodiments, the layer at which the Redirection Driver is inserted into the chain of drivers is based upon the level of storage access being redirected.

In some embodiments, the DARS optionally performs functions upon computer system shutdown. In one such embodiment, the DARS optionally saves the AST, PSRT, and UST tables so that the redirected data can be restored upon computer system reboot. In another embodiment, redirected data that corresponds to unprotected areas of storage is also saved.

In one embodiment, the DARS saves the AST and PSRT tables at a desired frequency to the hard disk, so that redirected data can be restored upon a system reboot.

DETAILED DESCRIPTION OF THE INVENTION

Embodiments of the present invention provide methods and systems for preserving an original state of a computer system upon rebooting. Common operating systems and application programs rely upon storing data to and retrieving data from persistent storage devices such as hard disks and other types of memory. Example embodiments of the present invention provide a Disk Access Redirection System (the "DARS") to allow all or portions of such storage to be protected from modification. Using the DARS, operating systems, application programs, and other code read and write data on a computer system storage device in a way that automatically allows the original state of protected portions of the storage device to be re-established when the computer system is rebooted. Specifically, the DARS evaluates storage access requests and automatically directs or redirects the flow of information so that, transparent to the user, the original state of the protected storage device is maintained and the changes to protected portions of the storage device are discarded when the computer system is rebooted. In this manner, security of the storage device is insured—even from a user who powers off the machine using a power switch without properly shutting down the system. Although primarily discussed below with reference to disk storage and access, especially hard disks, one skilled in the art will recognize that the techniques of the present invention are also applicable to other types of persistent and semi-persistent storage devices, including such devices as: CDROMS, Flash Memory, floppy disks, and other types of removable media storage devices.

The Disk Access Redirection System is useful in a multitude of situations, including those in which it is desirable to allow operators (users) of the computer system to actually use the system to produce useful output, but where the risk of leaving the system in an inoperable state is too high. For example, the DARS may be useful in a teaching situation where it is highly desirable that the computer system isn't truly modified after each teaching session and is returned to its initial state before each session. Or, for example, the DARS could be used in a library where a variety of persons with different levels of experience may need to use computer systems to locate particular pieces of literature, perform database searches, or edit documents (public access word processing, for example). In these situations, it is desired that the machine can be easily (and speedily) returned to some known, operable state.

Figure 1:
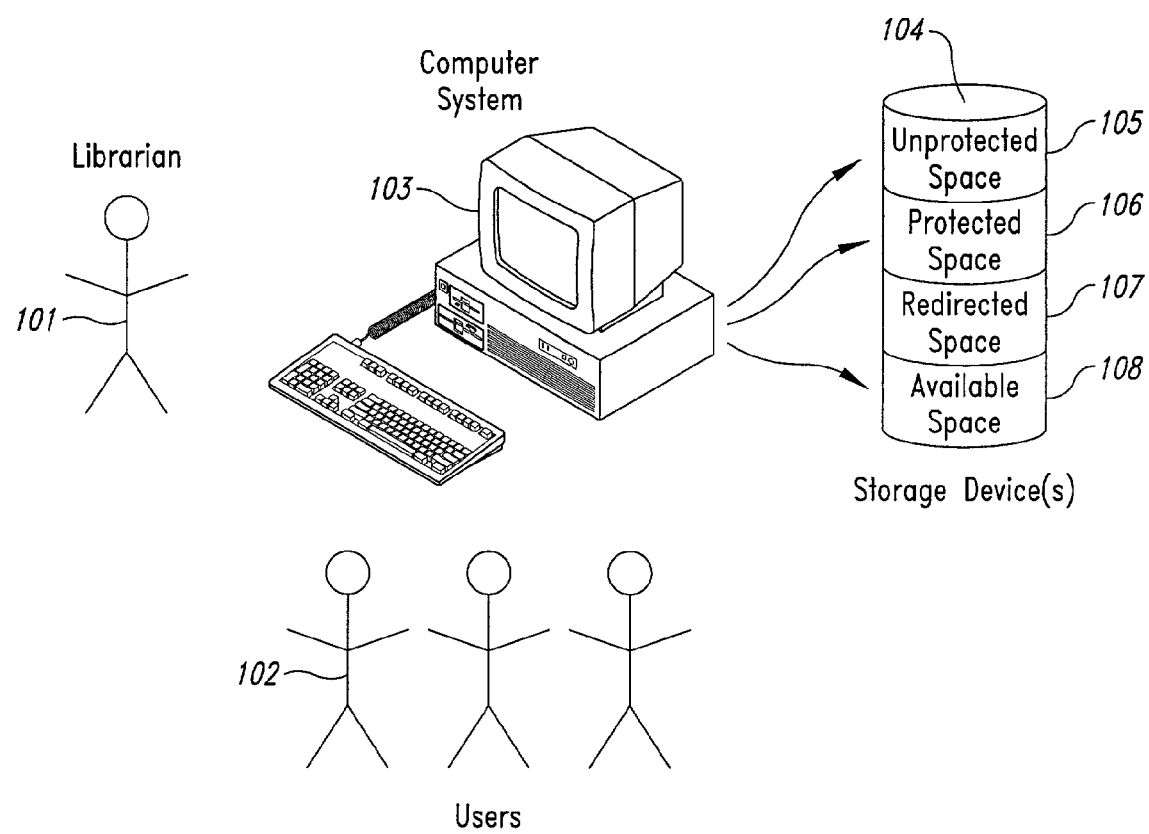
FIG. 1 is a graphic illustration of an example use of a Disk Access Redirection System (DARS) in a library.

FIG. 1 is a graphic illustration of an example use of a Disk Access Redirection System (DARS) in a library. A librarian 101 operates and maintains a computer system 103 for the benefit of various users 102. The computer system 103 includes a storage device 104 (for example, a hard disk) with available space 108. The users 102 may want to use the computer system 103, for example, to access an online card catalog, access the Internet, or perhaps even to download and execute programs on the computer system 103. Without the use of the DARS, the users 102 may store files on the hard disk 104 that may quickly exhaust the available space 108 or may execute malicious code, for example, that installs viruses on the hard disk 104. The DARS allows the librarian 101 to easily restore the original state of the disk, which preferably contains sufficient available space 108 and does not contain malicious code, by simply rebooting the system.

Specifically, the librarian 101 first installs and activates the DARS on the computer system 103. The DARS identifies space on the disk that is to be protected, protected space 106, and space that is available, available space 108, (e.g., space currently unused by any programs). Optionally, if only a portion of the disk is to be protected, unprotected space 105 may also be identified. As needed, the DARS allocates available space 108 to a "redirected" space 107. When the users 102 execute programs that request data to be written to the protected space 106 on the disk, the DARS automatically intercepts the write request and redirects the write to memory in the redirected space 107 on the disk. When the users 102 execute programs that request data to be read from the disk, the DARS intercepts the read request and, automatically determines from which location the read should be performed. When the librarian 101 or one of the users 102 shuts down the computer system 103, data stored in the redirected space 107 is discarded, rendering any apparent changes to the protected space 106 "lost" from the user's perspective and "ignored" from the system's perspective; when the computer system 103 is rebooted, the protected space 106 is unchanged from the state it occupied prior to installation of the DARS. In one embodiment, the DARS supports the ability to protect some but not all portions of the disk. In this case, when the computer system 103 is rebooted, modifications written to the unprotected space 105 remain.

Figure 2:
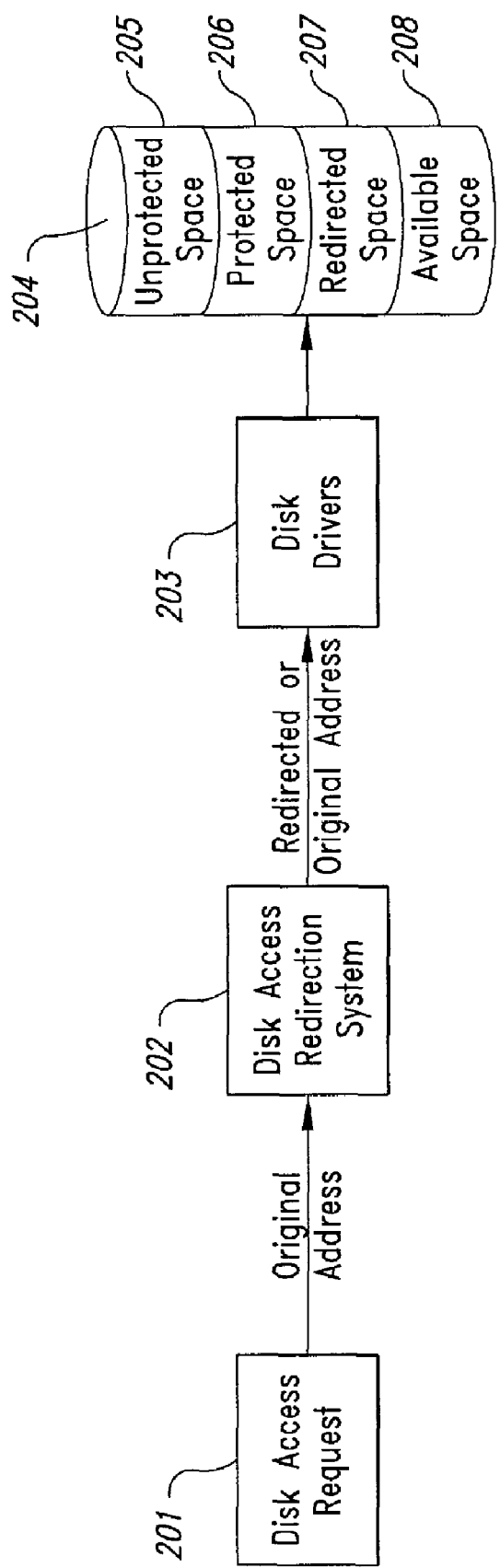
FIG. 2 is an example block diagram of disk access redirection performed by the Disk Access Redirection System.

FIG. 2 is an example block diagram of disk access redirection performed by the Disk Access Redirection System. In summary, the DARS operates by intercepting disk access requests before the appropriate device driver handles the disk access requests. A disk access request 201 is formed, for example, by an application program or an operating system function, and includes indicators that identify the type of request and the memory address to which the access is being requested. The DARS 202 intercepts the disk access request 201 before it is sent to the appropriate disk driver 203. The disk driver 203 then reads from or writes to the designated area on disk drive 204.

In a typical operating system, storage devices are accessed by device drivers that are organized according to a layered architecture. For example, in the Windows 9X or NT systems, developed by Microsoft Corporation, application requests to access a file are passed to one or more high level drivers, which process and eventually forward the request into one or more requests to a low level driver that communicates with a device using physical address indicators. The DARS 202 can be implemented to intercept disk access requests at several of these levels. Which driver(s) is (are) intercepted by the DARS 202 depends upon whether redirection is occurring on the file, cluster, or sector level, or according to some other logical drive division scheme implemented by the computer system or by the DARS 202.

Once the request is intercepted, the DARS 202 evaluates the type of the request and determines whether the requested original address or a redirected address should be accessed. The DARS 202 then forwards the disk access request 201 with the original address or a redirected address to the appropriate drivers 203. The disk drivers 203 then handle the disk access request 201, accessing as indicated, the protected space 206, the unprotected space 205, or the redirected space 207. One skilled in the art will recognize that in an alternative embodiment, the DARS 202 may handle the disk access request itself rather than forwarding the request to native operating system disk drivers. Other combinations, such as forwarding the request when the original address is used and handling it otherwise, are also contemplated.

Figure 3:
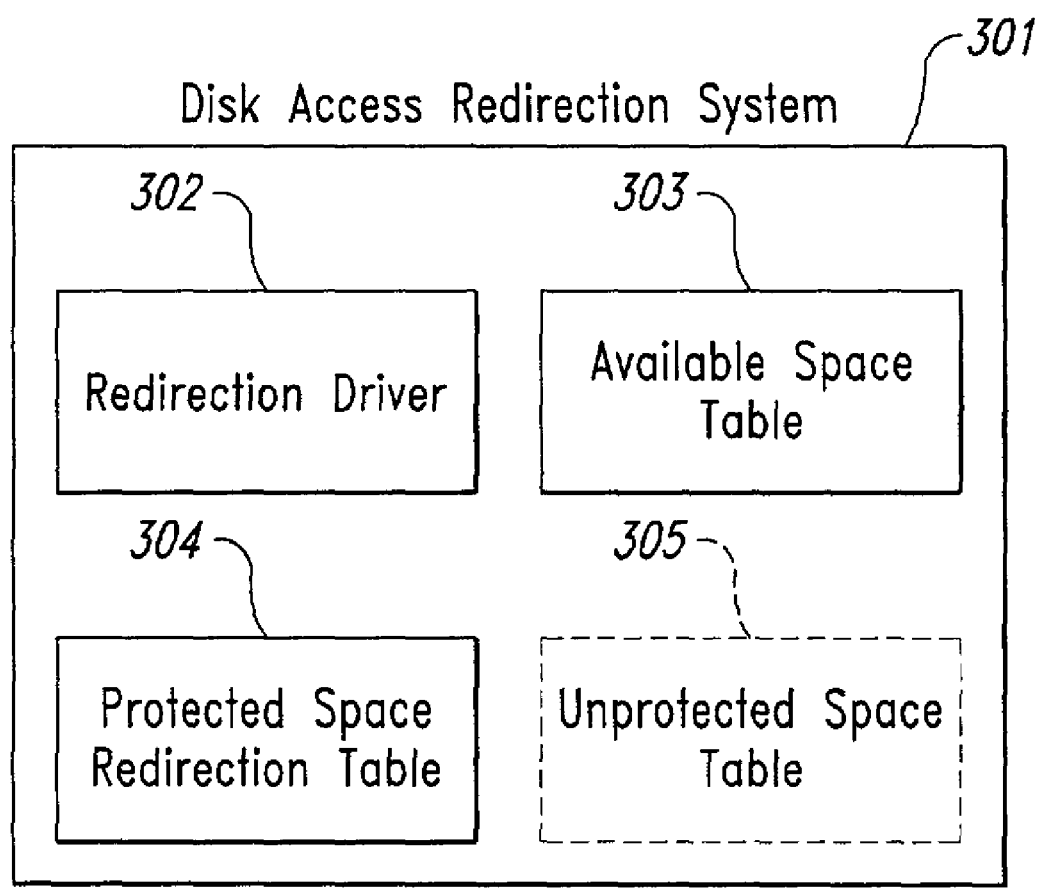
FIG. 3 is a block diagram of the components of an example embodiment of a Disk Access Redirection System.

FIG. 3 is a block diagram of the components of an example embodiment of a Disk Access Redirection System. The example embodiment of a Disk Access Redirection System 301 comprises a Redirection Driver 302, an Available Space Table (AST) 303, a Protected Space Redirection Table (PSRT) 304, and, optionally, an Unprotected Space Table (UST) 305. One skilled in the art will recognize that the AST 303, PSRT 304, and UST 305 may be stored in any type of storage, including for example, volatile memory. The Redirection Driver 302 intercepts the disk access request, determines whether or not the requested memory address is to be redirected, and forwards the disk access request to the next appropriate Input/Output ("I/O") driver. (See, for example, FIG. 2.) The AST 303 is used by the DARS 301 to map available memory for use as the redirected space (e.g., available space 208 and redirected space 207 in FIG. 2). The PSRT 304 is used by the DARS 301 to manage the mappings of protected space to redirected space (e.g., protected space 206 in FIG. 2). The UST 305 is used by the DARS 301 to map the unprotected space so that it is either written to directly or redirected to space that is preserved across boot sessions. The UST 305 is optional in that there may be implementations where all storage space is either protected or available, and none of the storage space is allowed to be unprotected (alterable).

Figure 4:
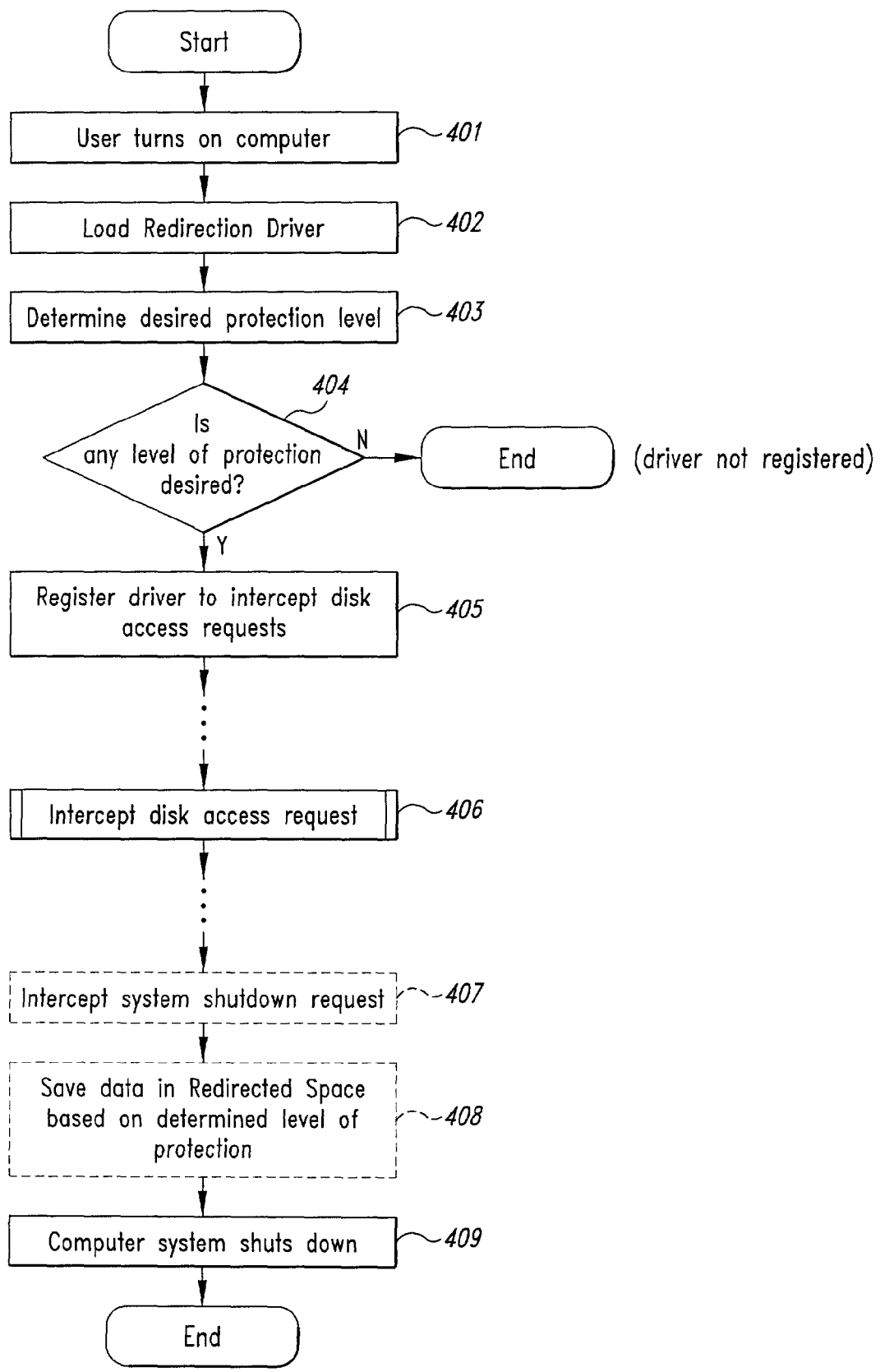
FIG. 4 is an overview flow diagram of the example operation of the Disk Access Redirection System to achieve storage preservation according to techniques of the present invention.

FIG. 4 is an overview flow diagram of the example operation of the Disk Access Redirection System to achieve storage preservation according to techniques of the present invention. In step 401, a user turns on the computer system. In step 402, the computer system loads the Redirection Driver. For example, in a computer system running the Microsoft Windows 9X Operating System, the redirection driver is stored in a special folder, for example the "windows\system\iosubsys" folder to be automatically loaded when the operating system boots up. In addition, the driver indicates to the operating system at which location in the layered architecture it desires to be installed. In another example, a computer system running the Microsoft Windows NT or 2000 Operating System, the redirection driver is registered with the operating system during an installation procedure. When the computer is booted, the redirection driver is loaded by the operating system. One skilled in the art will recognize that the specific steps necessary to install, register, initialize and/or load the redirection driver may vary depending on requirements of the operating system or other system components. These system dependent modifications are contemplated and are to be included within the scope of the invention.

In step 403, the computer system determines the desired protection level. For example, the computer system may allow a user, for example, a system administrator or other operator, to access a password protected user interface, through which the user specifies a desired level of system protection. The user interface may be implemented, for example, as a portion of the DARS redirection driver (which grabs control of the system right after it boots up) or as a separate part of the operating system installed as an initial start-up program. Example protection levels may include no protection, partial protection, and full protection. These protection levels correspond to the amount of security desired, where full protection insures no alteration of the persistent storage devices. In step 404, the system examines the determined protection level, and if no protection is desired, the DARS is effectively terminated in that the Redirection Driver is not initialized to intercept requests; otherwise, the system continues in step 405.

In step 405, if the DARS determines that the computer system is to be partially or fully protected, it registers the Redirection Driver to intercept disk access requests at the appropriate level as discussed with reference to FIG. 2. For the purposes herein, "registered" implies any actions (including none) that are required by a particular operating system to make the Redirection Driver known to the operating system so that the Redirection Driver can intercept access requests. In some cases, "registered" means that the Redirection Driver calls a particular operating system function to become known. In other cases, such as within Windows 9X, the driver is automatically registered to intercept requests at a location in the driver chain according to data stored in the Redirection Driver file at bootup time provided the driver is stored in the "windows\system\iosubsys" directory. In systems running the Windows NT operating system, data stored in the operating system registry when the driver is installed is used to register the driver at the correct level each time the system is booted.

In step 406, as disk access requests are received, the Redirection Driver intercepts the disk access requests. The steps performed by the DARS when the Redirection Driver intercepts disk access requests are discussed below in detail, with respect to FIG. 5. Typically, at some later point in time, in step 409, the computer system shuts down. Optionally, steps 407 and 408 are performed before the computer system shuts down. In step 407 the Redirection Driver intercepts the system shutdown request. In step 408, based on the determined protection level, the DARS may either save modifications that were made or discard them.

Figure 5:
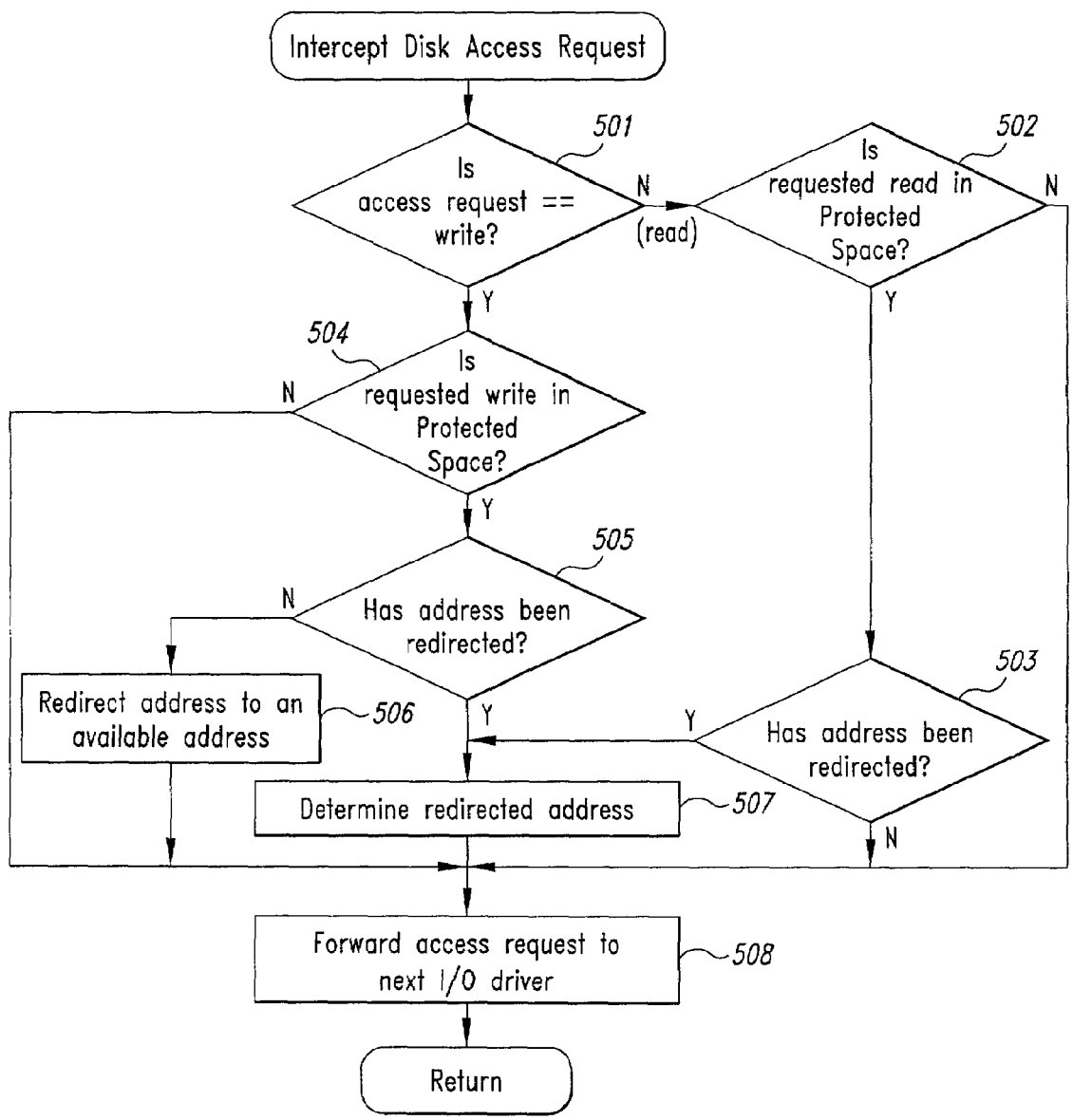
FIG. 5 is an example flow diagram of the steps performed by the Disk Access Redirection System when the Redirection Driver intercepts a disk access request.

FIG. 5 is an example flow diagram of the steps performed by the Disk Access Redirection System when the Redirection Driver intercepts a disk access request. As discussed above, with respect to FIG. 4, the computer system determines the protection level for the system. If no protection level is desired, the Redirection Driver is not initialized (or registered to intercept access requests), so has no effect on disk accesses. If at least partial protection of the computer system is desired, then the Redirection Driver is registered at the appropriate level in the system, for each storage device to be protected, and the following steps are performed when the Redirection Driver intercepts a disk access request.

Specifically, in step 501, the Redirection Driver determines whether the access requested is for a read or a write. If the request is for a read, the Redirection Driver continues in step 502, else, it continues in step 504. In step 502, the Redirection Driver determines whether or not the read is being requested against memory in the protected space (e.g., protected space 206 in FIG. 2). If the read is being requested against memory in the protected space (no alteration is allowed), the Redirection Driver continues in step 503, else it continues in step 508. In step 503, the Redirection Driver determines whether or not the requested memory address in the protected space already has been redirected to redirected space (e.g., redirected space 207), and, if so, continues in step 507, else continues in step 508. In step 507, the Redirection Driver determines the redirected address. In step 508, the Redirection Driver forwards the read request with the original or redirected address as determined to the next appropriate I/O driver.

When it is determined in step 501 that the requested disk access is for a write, then, in step 504, the Redirection Driver determines whether or not the write is being requested to memory in the protected space (the write is "unallowed"), and, if so, continues in step 505, else, continues in step 508 to forward the write request to the next appropriate I/O driver. In step 505, the Redirection Driver determines whether or not the requested memory address has been previously redirected (for example, due to a prior write request), and, if so, continues in steps 507 and 508 as described, else continues in step 506. In step 506, the Redirection Driver allocates an available memory address to be used for redirected space and maps the requested memory address to an address in the redirected space. The Redirection Driver then continues in step 508 as described above. In an alternate embodiment, in step 508, the Redirection Driver handles the disk access requests rather than forwarding them to a native operating system I/O driver.

Figure 6:
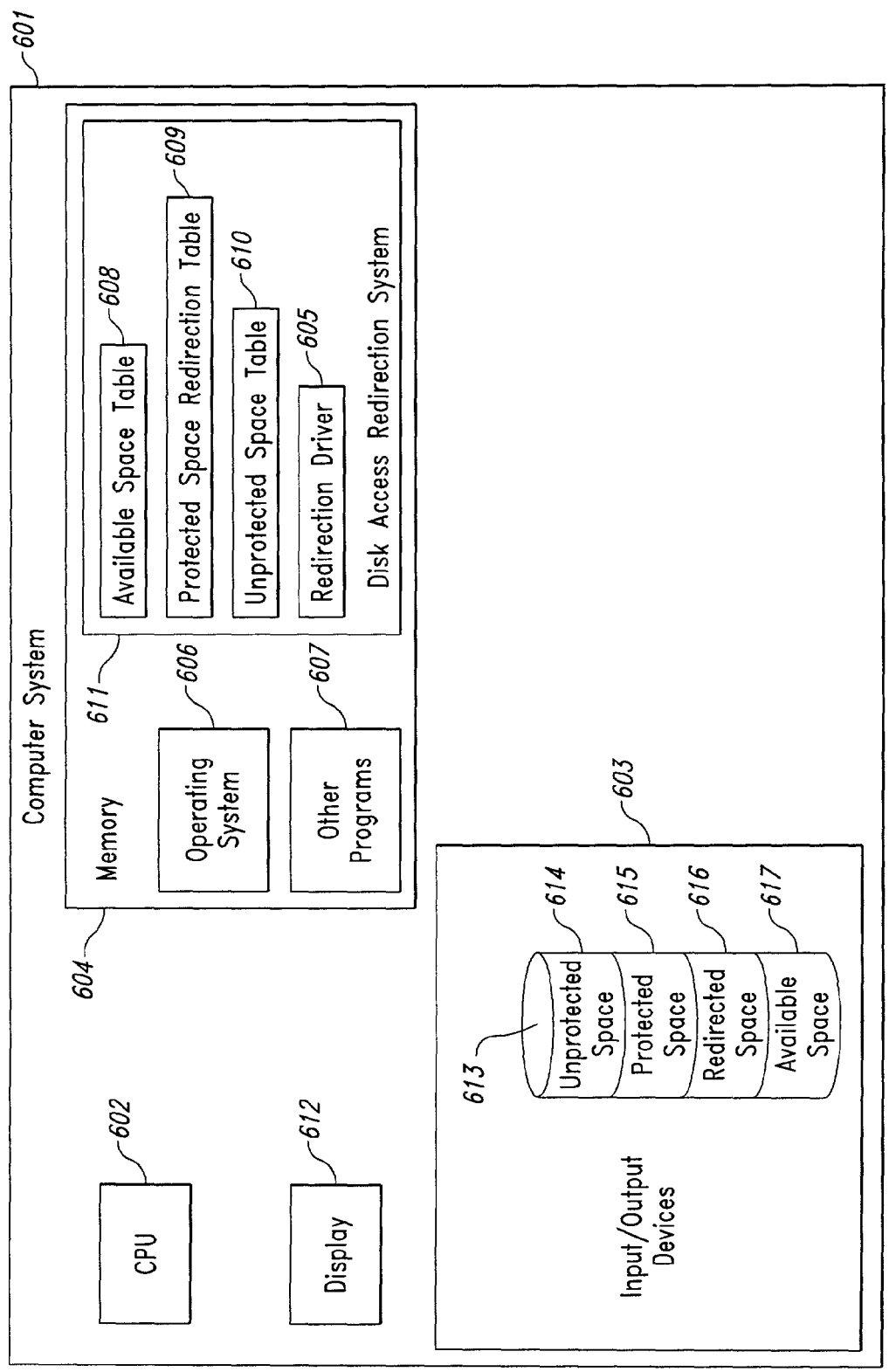
FIG. 6 is an example block diagram of a general purpose computer system for practicing preferred embodiments of the present invention.

FIG. 6 is an example block diagram of a general purpose computer system for practicing preferred embodiments of the present invention. The computer system 601 contains a central processing unit (CPU) 602, input/output devices 603, including storage device 613, a display device 612, and a computer memory (memory) 604. The Disk Access Redirection System 611, comprising Redirection Driver 605, Available Space Table 608, Protected Space Redirection Table 609, and Unprotected Space Table 610 preferably resides in memory with the operating system 606 and other programs 607. The storage device 613 contains an unprotected space 614, a protected space 615, a redirected space 616, and an available space 617. One skilled in the art will recognize that the storage device 613 may be implemented in any of various configurations including, for example, one or more physical or virtual disk drives located on one computer or located on multiple computers connected through a network.

One skilled in the art also will recognize that various arrangements of this computer system and its components are possible and contemplated by the methods and systems of the present invention. For example, the various tables of the Disk Access Redirection System may reside in separate memories or span across several memories or be non-contiguous. Well-known techniques for handling such data structures and memory management can be used. In addition, the Redirection Driver, before being installed into memory, may be remotely located and accessed for use via a network when desired. Various other modifications to the storage organization and the location of the other parts of the computer system are also contemplated. In addition, in the example flow diagrams described, different orderings of the steps and different divisions of the steps are likewise contemplated to accomplish the techniques of the present invention.

As previously mentioned, the Redirection Driver 605 may be implemented to intercept I/O (input/output) requests at various levels in the storage driver architecture of the operating system 606 depending upon what level of abstraction of storage is being redirected. For example, the Redirection Driver 605 may be implemented to redirect data access at the file level or at the physical sector address level, or at some other level. Additionally, multiple Redirection Drivers may be used, for example, one Redirection Driver for each storage device type, or for different levels of access.

Figure 7:
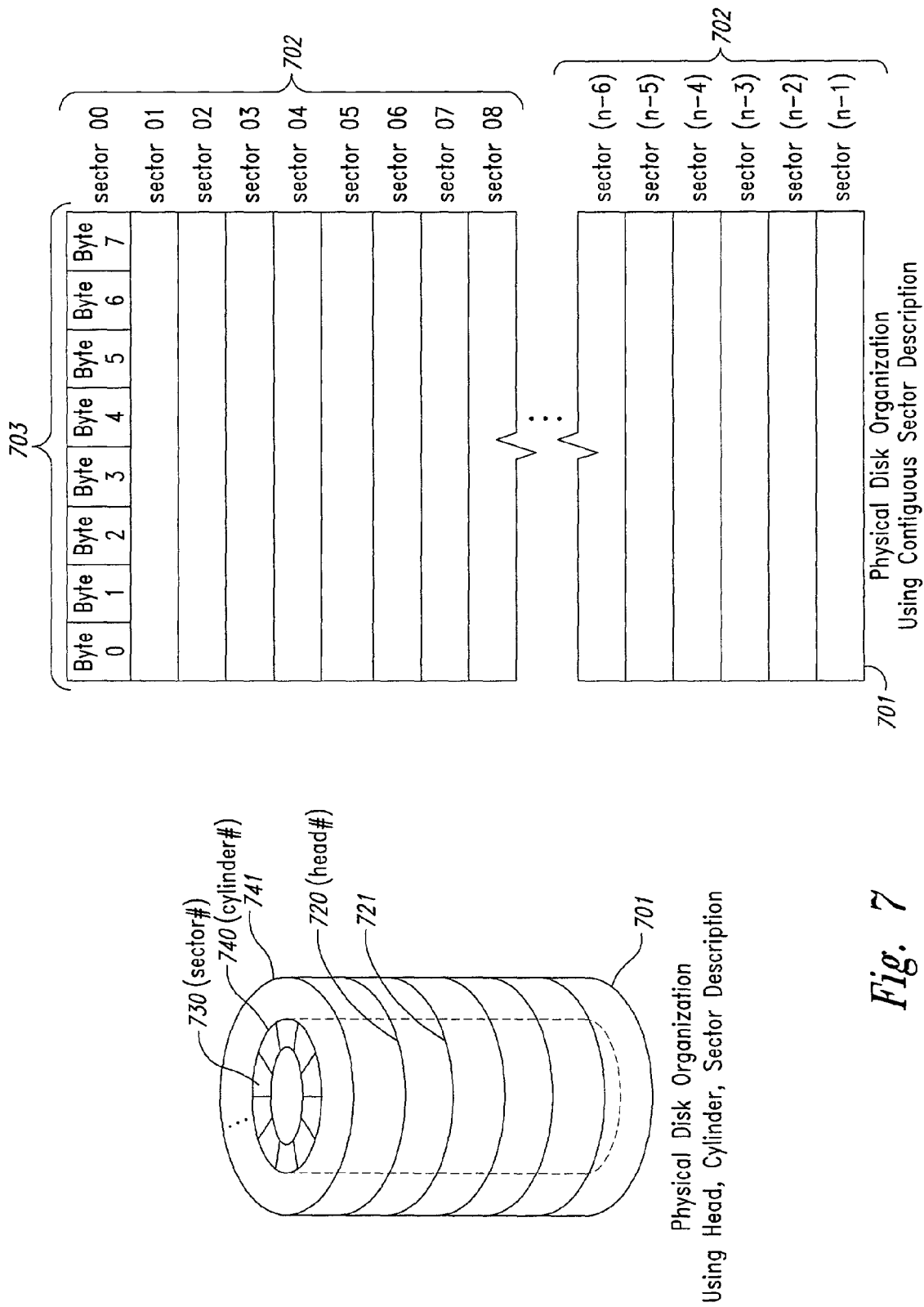
FIG. 7 is an example block diagram of a typical layout of a physical disk storage device in a computer system.

FIG. 7 is an example block diagram of a typical layout of a physical disk storage device in a computer system. As shown on the left side of FIG. 7, a disk storage device 701 is made up of a series of sectors 730. Each sector may be identified by (1) a head number (e.g., 720), which defines the disk surface where the sector resides; (2) a cylinder number (e.g., 740), which defines the track where the sector resides; and (3) a sector number (e.g., 730) within the associated track. These identifying attributes may then be used to map a unique number to each physical sector. The right side of FIG. 7 shows the same disk storage device 701, but using a contiguous sector description 702. For example, the first sector is assigned the number 00, the second is assigned the number 01, and so on. This allows each sector to be accessed through a simple indexing scheme, $0, 1, 2 \ldots (n-1)$, where n is the total number of sectors on the physical disk. Each sector 702 comprises a fixed number of bytes 703. For example, Sector 00 contains 8 bytes, labeled Byte 0-Byte 7.

Figure 8:
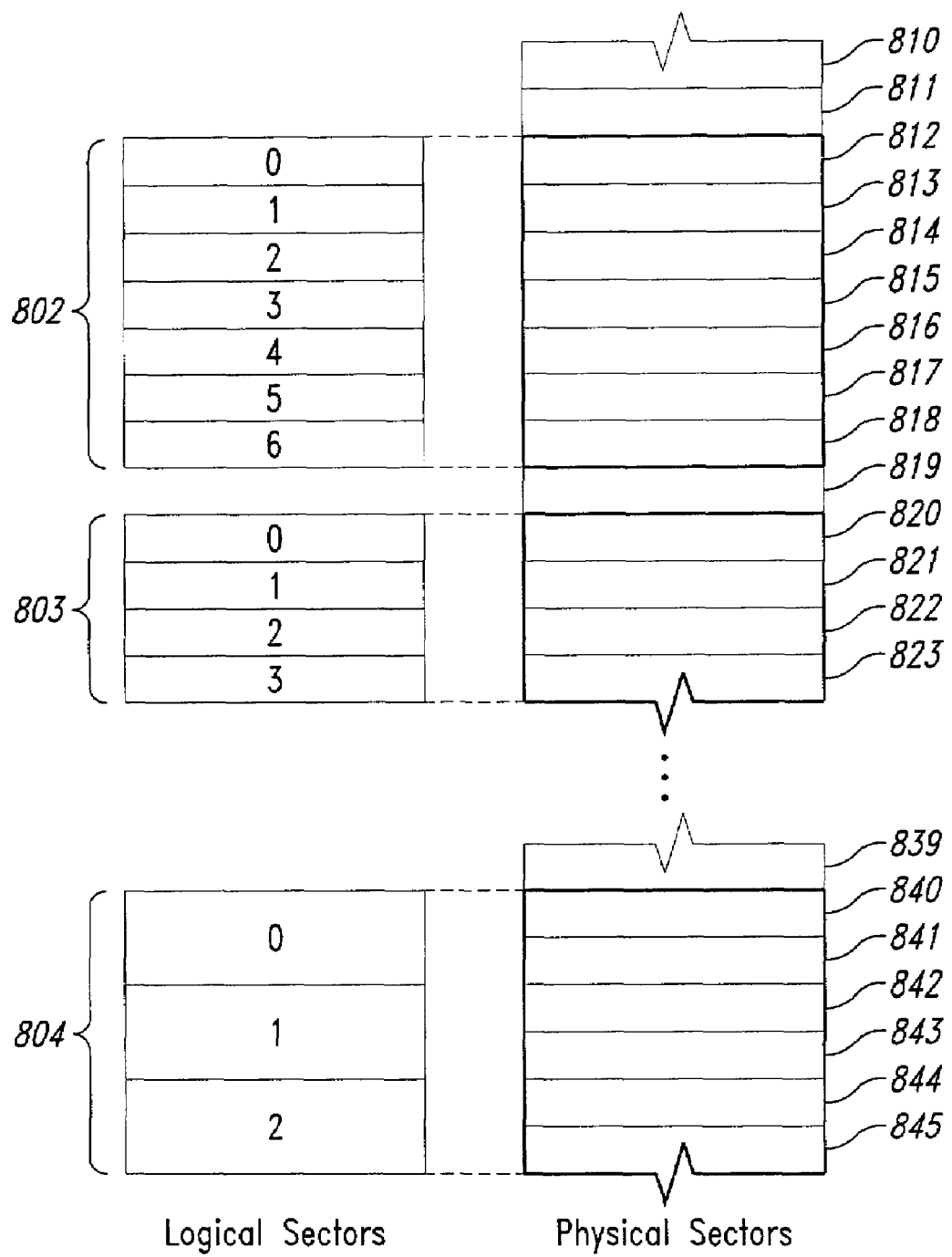
FIG. 8 is an example block diagram of a disk drive partitioned into logical drives (partitions).

In addition, a physical disk may be partitioned into one or more logical drives. FIG. 8 is an example block diagram of a disk drive partitioned into logical drives (partitions). The disk drive is shown divided into 3 logical partitions: 802, 803, and 804. Within a partition, the sectors are referred to as logical sectors. For example, partition 802 contains physical sectors 812-818 which are mapped to logical sectors 0-6, and partition 803 contains physical sectors 820-823 mapped to logical sectors 0-3. Logical sectors are accessed by a simple indexing scheme $0, 1, 2, \ldots (n-1)$ relative to the partition, where n is the number of logical sectors in the partition. The size in bytes of a logical sector is not necessarily the same as a physical sector, but may be an integral number of physical sectors. For example, partition 804 contains physical sectors 840-845 mapped to logical sectors 0-2, where each logical sector is equal in size to two physical sectors. Although logical partitions 802, 803, and 804 are shown mapped to contiguous physical sectors, in some systems, logical partitions may be mapped to non-contiguous physical sectors.

User or application information and other data are typically stored in files. A file can be stored on a logical drive in one or more logical sectors, which may or may not be contiguous. Different operating systems use different schemes to keep track of where a file is stored on a logical drive and to keep track of which sectors a file occupies. Often times some sort of "table," "database," or other appropriate data structure, is used to locate the file on the logical drive and to track the sectors allocated to the file. In some systems, to reduce the size of the database required to describe the files on a disk storage device, the abstraction of a cluster is used. A cluster is an integral number of sequential sectors. For example, in the Windows 9X operating system, a cluster can be up to 64 logical sectors. The way that an operating system organizes files into clusters and the way it keeps track of this organization in a "database" is typically referred to as the file system. The database used by the file system must also be stored on the disk storage device. This database can be stored on the logical drive as a sequential set of logical sectors that is fixed in size and location, or it can be stored as a special file where access to it is achieved through a smaller fixed set of data.

In any operating system and file system, user and application data starts out in the form of a file. The operating system maintains a database of the clusters that are used to store the file data. Any read or write of a file or portion of a file ends up being a read or write of one or more physical sectors. Modem operating systems are typically coded in such a way that the file system reads and writes to a disk storage device through a layering of drivers as briefly described above. These drivers are defined such that drivers at the top communicate at the file level, while drivers at the bottom communicate at the physical sector, level of the disk storage device. At some point in the layered input/output system, a driver can be inserted to intercept all the reads and writes at the level it is inserted, for example, at either the logical sector level or the physical sector level.

Figure 9:
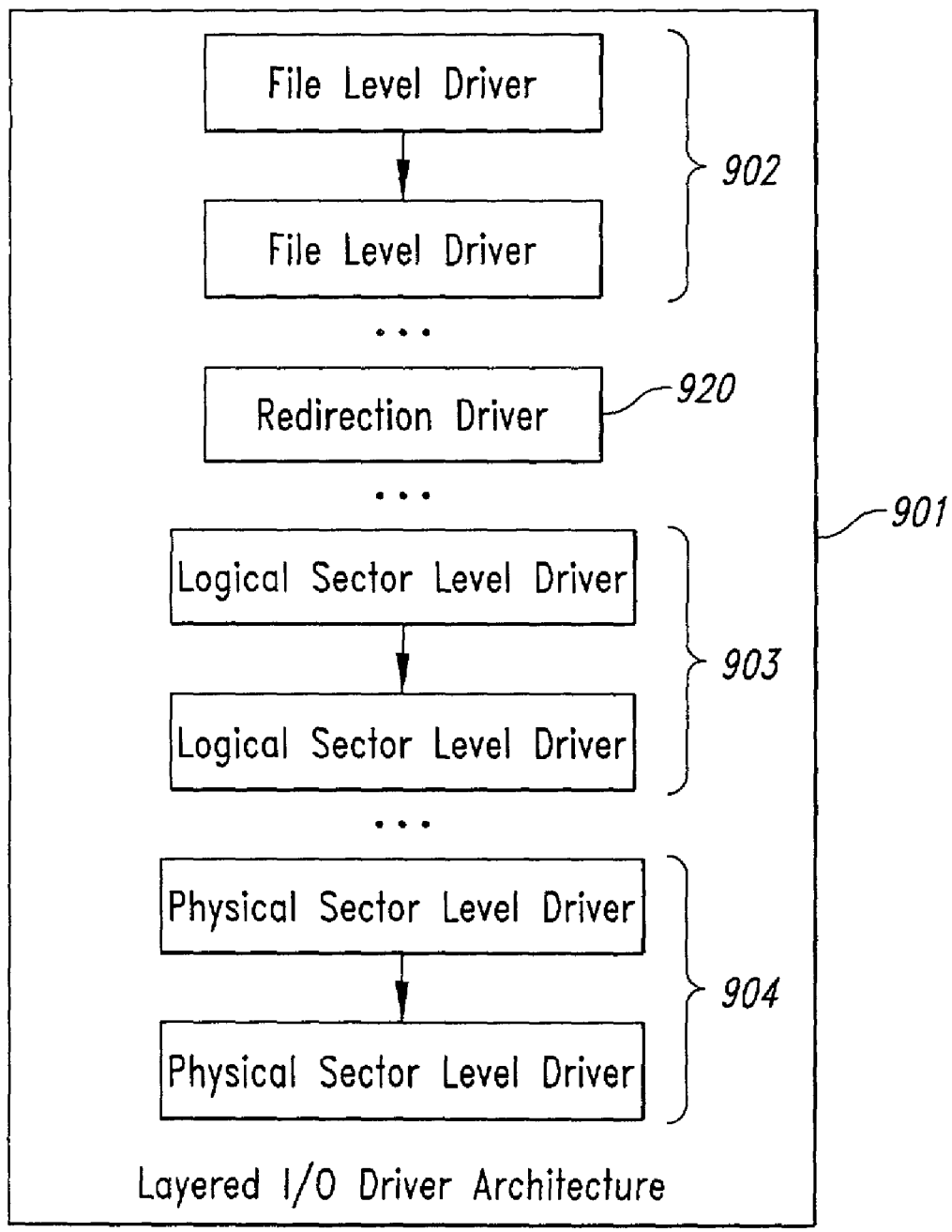
FIG. 9 is an example block diagram of a layered I/O driver architecture of a typical operating system with an inserted Redirection Driver.

FIG. 9 is an example block diagram of a layered I/O driver architecture of a typical operating system with an inserted Redirection Driver. The layered I/O driver architecture 901 comprises file level drivers 902, logical sector level drivers 903, and physical sector level drivers 904. In FIG. 9, the Redirection Driver 920 implements logical sector redirection, so is shown inserted before the other drivers that handle logical sectors 903. When a request for file access comes in, a file level driver 902 translates the request into a read or a write request of the appropriate logical sectors and forwards the translated request down the driver chain. The Redirection Driver 920, which has been inserted into the driver chain before logical sector drivers 903, receives the translated request and processes the request according to the present invention. One skilled in the art will recognize that the Redirection Driver 920 can be similarly inserted at other points (or at multiple points) in the driver chain, depending upon what disk access abstraction has been implemented in the driver.

In example embodiments of the Disk Access Redirection System, the Available Space Table 608, Protected Space Redirection Table 609, and Unprotected Space Table 610 may be organized at the logical sector level, at the cluster level, at some other level of data abstraction, or a combination of data abstraction levels. When organized at the sector level, the Protected Space Redirection Table 609 tracks all sectors that can be redirected, and each entry corresponds to one logical sector. For example, if an entry for a particular sector is zero, then no redirection has occurred. In contrast, if an entry is non-zero, then redirection has occurred, and an indicator of the redirected sector is stored in that table entry. (The actual entry may contain a variety of data, such as a logical sector address in Redirected Space, or a pointer to an entry in the AST 608, which is allocated to the Redirected Space.) When organized instead at the cluster level, the Protected Space Redirection Table 609 tracks all clusters that can be redirected, and each entry in the table corresponds to one cluster. For example, if an entry for a particular cluster is zero, then no redirection has occurred. In contrast, if an entry is non-zero, then redirection has occurred, and an indicator of the number of the redirected cluster (or other reference) is stored in the table entry.

The basis of redirection may be clusters, sectors, or any other level of data abstraction, and is based on the organization of the DARS. In some embodiments, the use of clusters will reduce the memory size of the DARS. One embodiment organizes the DARS tables as groups of clusters or sectors instead of as individual clusters or sectors. When using groups of clusters, a table entry consists of a cluster number and an extent (i. e., a number of sequential clusters). Because operating systems attempt to keep reads and writes of related data in sequential clusters, the first write to a cluster will usually be a write to a sequence of clusters. For example, if a write operation calls for data to be stored in clusters 5, 6, 7, 8, 9, and 10, this information may be stored in a table where each element in the table consists of 3 pieces of information: (1) the original starting cluster number, (2) the number of sequential clusters, and (3) the number of the first redirected cluster. In this example, storing the redirection information in the Protected Space Redirection Table 609 requires only three numbers, rather than the six required when redirection information is referred to as individual clusters. As the write blocks get larger, the savings in memory become significant. No matter how large the write becomes, only three numbers are required to store all the redirection information. The other DARS tables can be similarly implemented in terms of logical sectors, clusters, or a combination of both.

Figure 10:
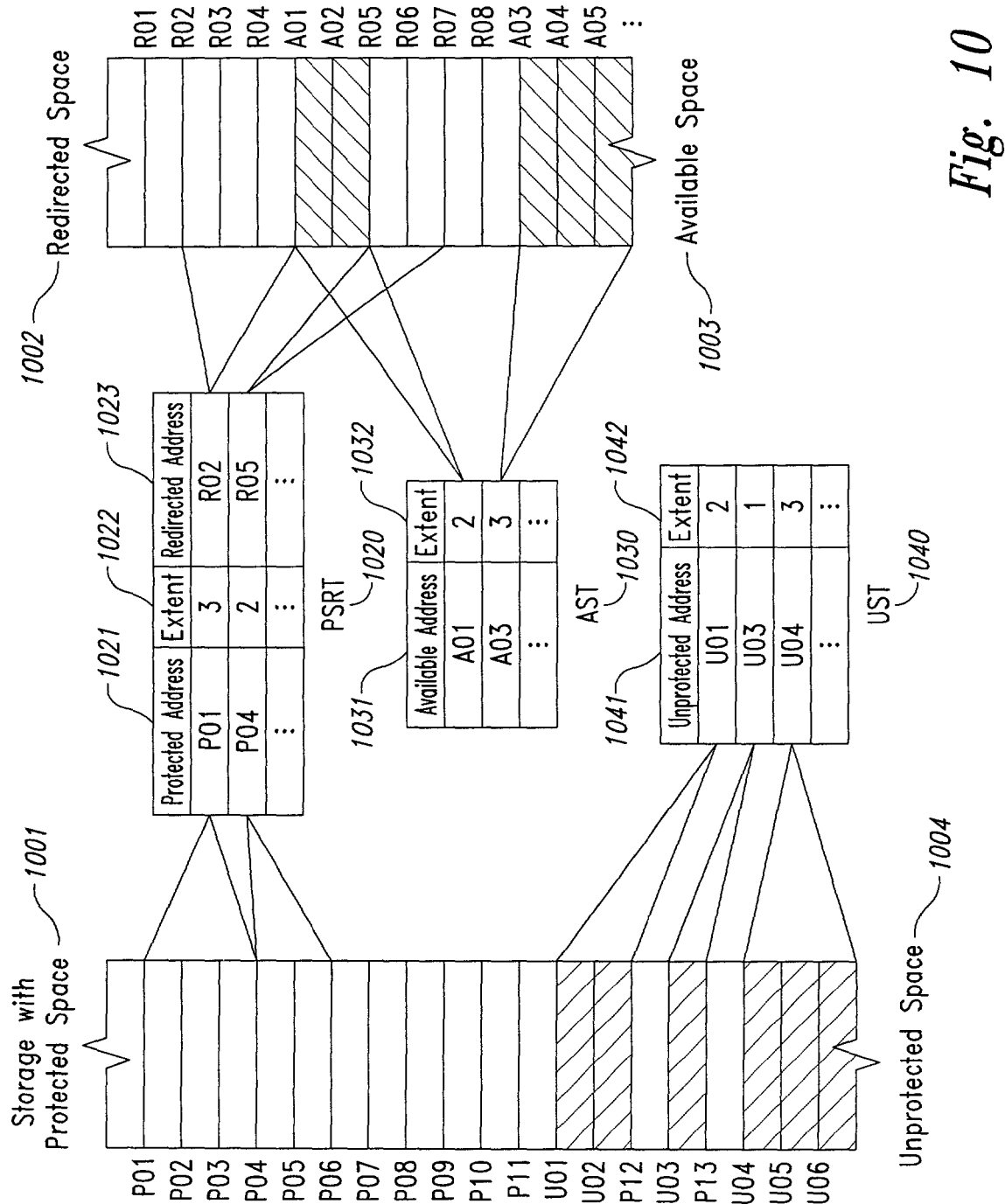
FIG. 10 is an example block diagram illustrating how the Disk Access Redirection System tables are used by the Redirection Driver to redirect disk accesses.

FIG. 10 is an example block diagram illustrating how the Disk Access Redirection System tables are used by the Redirection Driver to redirect disk accesses. As described earlier, disk storage comprises protected space 1001, which cannot be altered; unprotected space 1004, which can be altered; redirected space 1002, which stores attempted alterations to the protected space 1001; and available space 1003, which is currently unused space. The tables of the DARS (tables 1020, 1030, and 1040) are used to manage the mappings between the protected space 1001, redirected space 1002, available space 1003, and unprotected space 1004. The Available Space Table 1030 ("AST") maps the available space 1003 (shown hatched); the Protected Space Redirection Table 1020 ("PSRT") maps the protected space 1001 to the redirected space 1002; and the Unprotected Space Table 1040 ("UST") maps/records the unprotected space 1004 (shown hatched).

In one embodiment, the AST 1030 stores a series of records, each record indicating a portion of memory that is available for redirection use. The AST may be organized as a simple list of available cluster numbers, or it may be organized as a table of items, each of which contain a starting cluster number and an extent (i.e., number of sequential empty clusters). In the embodiment shown, each AST record comprises an available address 1031 that indicates the beginning of an available portion of memory and an extent 1032 that indicates the length of the available portion of memory (e.g., the first shown record indicates two clusters of storage with addresses A01 through A02). As empty clusters are used for redirection, they are removed from the AST or marked as not available. A write operation of "n" sequential clusters generates a request for "n" sequential empty clusters for redirection. The AST services this request. If it is not possible to find "n" sequential clusters in the AST, the request is preferably broken up into smaller units.

The UST 1040 is similar to the AST 1030, storing a series of records, each comprising a beginning address 1041 and an extent 1042 (e.g., the first shown record indicates two clusters of storage with addresses U01 through U02). The records in the UST indicate portions of unprotected space 1004, which can be altered. In an alternative embodiment, the unprotected space 1004 is mapped via the UST 1040 to redirected space 1002 and saved upon computer shut down. This embodiment has the disadvantage of potentially losing data written to the unprotected space 1004 when the user simply powers down the machine using the hardware power switch, without gracefully shutting down the operating system and allowing the redirected space 1002 to be saved.

The PSRT 1020 maps portions of protected space 1001 to redirected space 1002. Each record in the PSRT 1020 comprises a protected address 1021 that indicates the beginning of a protected portion of storage, an extent 1022 that indicates the length of the protected portion of storage, and a redirected address 1023 that indicates the beginning of a portion of memory to which all reads and writes to the indicated protected address of that record will be redirected. For example, in the first record, addresses P01 through P03 of storage in the protected space 1001 (as shown by an extent of 3 clusters) is currently redirected to addresses R02 through R04 in the redirected space 1002. Although described with respect to clusters, one skilled in the art will recognize that a similar organization and description can be used to implement the tables and the space layout using other abstractions, such as at the file level or sector level.

In an example embodiment shown, the AST, UST, and PSRT (e.g., AST 1030, UST 1040, and PSRT 1020 in FIG. 10) are stored in a volatile memory of the computer system. In alternate embodiments, these tables may be written to persistent storage and deleted prior to the computer system being shut down. In another alternate embodiment, the determined system protection level may indicate whether the tables are stored in volatile memory or persistent storage. For example, one level of protection may be defined which maintains the AST, PSRT, and UST in persistent storage across several system reboots. This may be beneficial on a system that is being used to test new software. When testing is complete, or at various stages during the testing process, the system protection level could be modified to a level that causes the DARS to store the AST, PSRT, and UST in volatile memory or to delete them from persistent memory on shutdown. As one skilled in the art will recognize, various protection levels may be defined, each requiring possible variations in implementation of the DARS system tables. These variations may include the specific data structures of the tables in addition to the type of memory used to store the tables. Well-known techniques for varying the data structures and for indicating mappings can be used. All of these variations are contemplated and are intended to fall within the scope of the invention.

In some operating systems, certain portions of protected memory need to be redirected prior to allowing a user access to the system. In particular, in operating systems whose file systems store data on persistent storage, it is necessary to redirect the file system data itself to properly protect these systems. For example, in the Microsoft DOS and Windows™ operating systems, there are a number of different file systems, which store data on a system hard drive. These systems use a File Allocation Table (FAT) to track and allocate clusters to files. In particular, FAT file systems use a table of "next" cluster numbers. To work correctly in these environments, the DARS is implemented to handle both the FAT 16 system and the FAT 32 system. In FAT 16, the FAT is a table of 16 bit cluster numbers. In FAT 32, the table consists of 32 bit cluster numbers.

Figure 11:
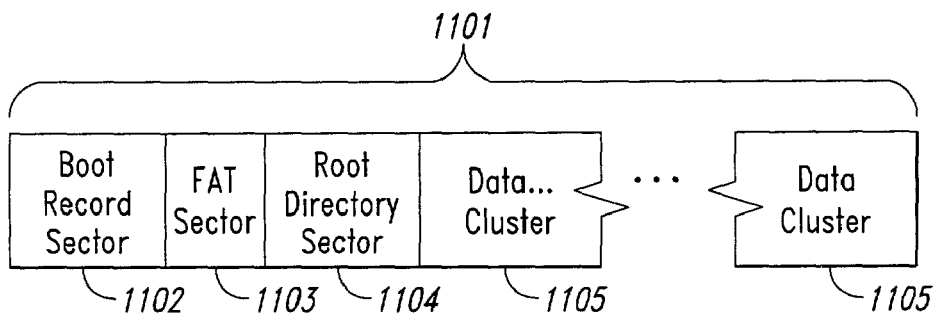
FIG. 11 is an example block diagram of a disk drive with a File Allocation Table arranged according to the FAT 16 architecture.

FIG. 11 is an example block diagram of a disk drive with a File Allocation Table arranged according to the FAT 16 architecture. In FIG. 11, a logical drive 1101 is organized as: (1) Boot record sector 1102, (2) FAT sector 1103, (3) Root directory sector 1104, and (4) Data clusters 1105. The first three sections 1102, 1103, and 1104 are fixed in size. The data section starts at a fixed point on the drive and is viewed by the operating system as a sequence of clusters.

Figure 12:
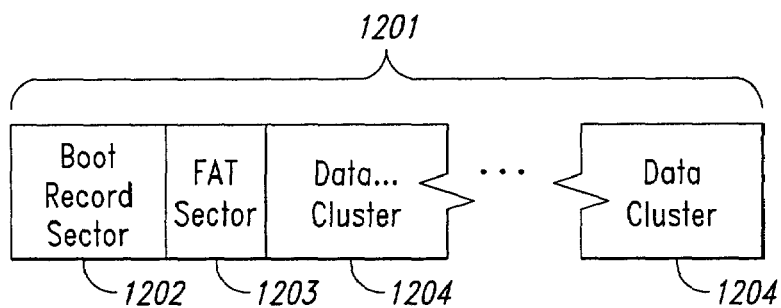
FIG. 12 is an example block diagram of a disk drive with a File Allocation Table arranged according to the FAT 32 architecture.

FIG. 12 is an example block diagram of a disk drive with a File Allocation Table arranged according to the FAT 32 architecture. A logical drive 1201 is organized as: (1) Boot record sector 1202, (2) FAT sector 1203, and (3) Data clusters 1204. The first two sections 1202 and 1203 are fixed in size. The data section starts at a fixed location and is viewed by the operating system as a sequence of clusters.

Figure 13:
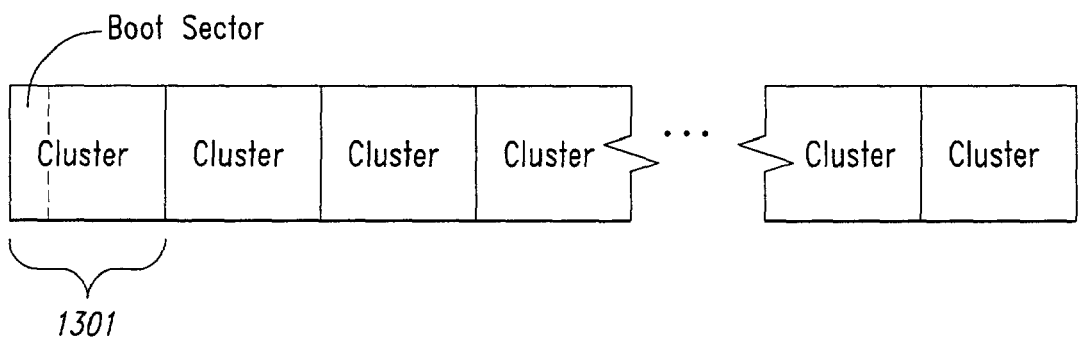
FIG. 13 is an example block diagram of a disk drive arranged according to the New Technology File System ("NTFS") architecture.

FIG. 13 is an example block diagram of a disk drive arranged according to the New Technology File System ("NTFS") architecture. The entire logical drive is organized using cluster segmentation, and all data is organized as files within the cluster framework. For example, cluster 1301 contains the Boot Sector.

The DARS is implemented to redirect all portions of the disk drive, including those used by the operating system, as shown in FIGS. 11, 12, and 13. This feature allows a random hardware "power off" to leave the system secure. One method of implementing the DARS in FAT 16 and FAT 32 is to define two sets of the AST and PSRT redirection tables, which are organized to different data size abstractions. According to this embodiment, the redirection tables are sector-based for that part of the disk drive that precedes the data section and cluster-based for the data part (the remainder) of the disk drive. Because all available space on a drive will be in the data section of the drive, sectors from the pre-data part of the drive are redirected to the cluster organized part of the drive. Thus, several computations are necessary in this embodiment to translate sectors to clusters and vice versa.

To determine in which cluster a logical sector lies, the DARS in this example embodiment uses the following formula:

$$\text{Cluster} = ((L\text{Sector} - D0)/SPC) + 2; \tag{1}$$

where,
  D0=logical sector number where the data section starts
  SPC=# sectors per cluster.

The +2 results from a specific nuance in that the FAT 16/32 architecture labels the first cluster in the "data" section as Cluster 2.

To calculate the first sector of a cluster, the DARS uses the formula:

$$L\text{Sector} = ((\text{Cluster} - 2) * SPC) + D0. \tag{2}$$

To calculate the offset within a cluster for a given logical sector, the DARS uses the formula:

$$\text{Offset} = (L\text{Sector} - D0) \% SPC. \tag{3}$$

Where the "%" is a modulus operator that gives the integer remainder from a division.

Using the Microsoft New Technology File System "NTFS", the operating system views the entire disk drive as a sequence of clusters, and all space on the drive is allocated in clusters. (See FIG. 13.) Conversion from clusters to sectors or sectors to clusters is required because the file system usually handles cluster numbers, but reads and writes are usually handled as sectors. For example, queries for available space will usually be obtained in terms of clusters. Therefore, the following example formulas can be used to translate between logical sectors and clusters:

$$LSector = Cluster * SPC \quad (4)$$

$$Cluster = LSector/SPC \quad (5)$$

For purposes of managing the redirection information generically, the DARS can be implemented using a concept of virtual clusters. In this implementation, the DARS only deals with redirection at the cluster level and is designed to be independent of the file system and the operating system.

Real cluster numbers are translated to virtual clusters using the formula:

$$VCluster = RCluster + Offset; \quad (6)$$

where,
Offset=(C0/SPC)+A;
C0=the logical sector number of Real Cluster zero.
SPC=the number of sectors per cluster
A=(C0 % SPC)?1: 0; Where the "?" is an operator, indicating that if the expression (C0 % SPC) evaluates to "true" (any non-zero value), then A=1. If the expression (C0 % SPC) evaluates to "false" (zero), then A=0.

The virtual cluster number that contains a logical sector is given by:

$$VCluster = (LSector - SO)/SPC \quad (7)$$

where,
SO=(C0 % SPC) is the offset of sector zero within Virtual cluster zero
The first sector of a VCluster is:

$$LSector = (VCluster * SPC) + SO; \quad (8)$$

To calculate the offset within a virtual cluster for a given logical sector, the DARS uses the formula:

$$Offset = (LSector - SO) \% SPC \quad (9)$$

In an embodiment that uses virtual clusters, the virtual clusters don't have to be redirected to physical clusters on the same drive. Clusters may be redirected to any place where storage is available, for example, on other drives, on network drives etc. The virtual cluster concept only requires an object of "available space" to which clusters may be redirected, and thus has the advantage of flexibility for a variety of operating systems. Virtual clusters may also be implemented to include virtual sectors or any other "virtual" data abstraction level. In systems that support object-oriented programming, the virtual cluster can be implemented as a class, whose implementation is specified by a particular instance of the Redirection Driver.

In some embodiments, a protection level is supported that allows the specification of some unprotected space. (For example, unprotected space 1004 in FIG. 10.) Unprotected space can be implemented by allowing some set of sectors to be read and written into their original locations. Storage that is designated as unprotected is persistent through a reboot. By making the unprotected space appear to the operating system as a drive (which is designated to not be redirected), files can be stored in this space that will be persistent through a reboot. Specifically, because the Redirection Driver can be implemented to intercept reads and writes at the file level, files thus can be redirected into unprotected space—a special drive—instead of redirected space. The information in these files will then be persistent through a reboot. Redirection at the file level may be implemented such that the file appears to the user as if it is still in its original location.

In an alternative embodiment, an option is presented to a user to save the modifications attempted to protected space. For example, an option can be presented upon computer system shut down to save redirected data in this fashion. The DARS tables contain the information necessary to identify all modifications to the protected space. Thus, by transferring the information to the appropriate file allocation tables, the DARS can make the changes that have been made in the redirected space permanent in the protected space. For example, a user may wish to protect the data on a computer system while running a new software application in order to prevent unexpected data modifications. After running the software application and verifying that no unwanted modifications were made, the changes that were made in the redirected space can be made permanent in the protected space. If unexpected data modifications were made, the user could simply re-boot the computer system, restoring the original data.

In an example embodiment of the DARS, implemented on a computer system running the Microsoft Windows 9X operating system, the Redirection Driver is implemented with the standard driver entry points that allow the operating system to communicate with any driver. The operating system supports the implementation of a Virtual Device Driver (a VxD), which can be inserted into the driver chain, so that the standard entry points of the driver are invoked by the operating system when the associated event is triggered.

FIGS. 14-18 are example flow diagrams describing the steps performed by the DARS Redirection Driver at each of five standard driver entry points. One skilled in the art will recognize that a Redirection Driver may be implemented with additional entry points or other entry points, and that the five entry points described with relation to FIGS. 14-18 are intended only to be an example of a preferred embodiment, and are not intended to limit the scope of the invention.

Figure 14:
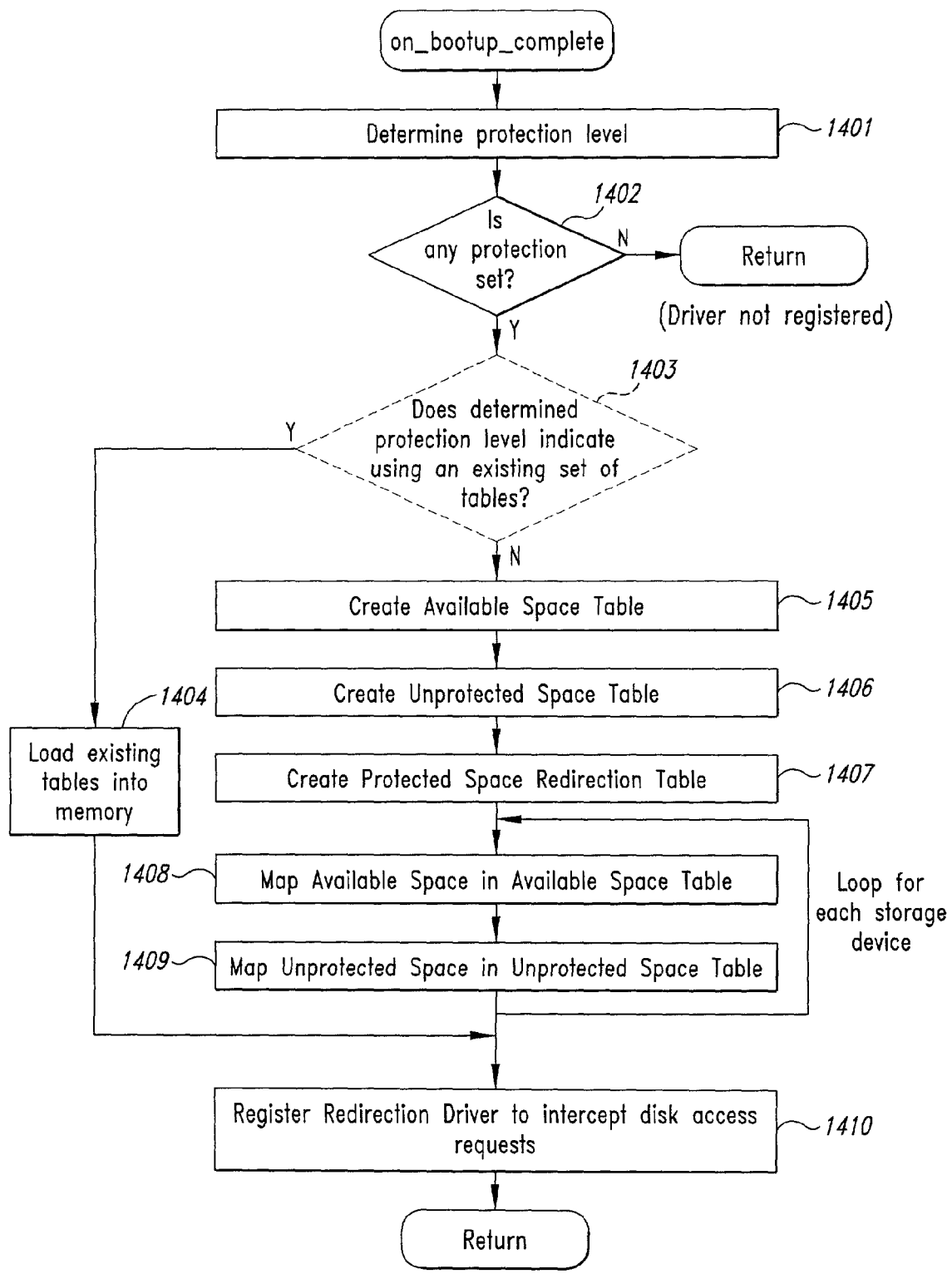
FIG. 14 is an example flow diagram of the steps performed by the Disk Access Redirection System when the computer system boots up.

FIG. 14 is an example flow diagram of the steps performed by the Disk Access Redirection System when the computer system boots up. In step 1401, the computer system or a portion of the DARS determines the protection level for the computer system, as described with reference to FIG. 4. In step 1402, the DARS examines the determined protection level, evaluating whether or not any protection is to be implemented for the computer system. If no protection is to be performed for the computer system, the Redirection Driver is not registered (not inserted into the driver chain) and will not intercept any disk access requests. If full or partial protection is designated, then the DARS continues in step 1405, to create an Available Space Table to map all of the available space for the appropriate disk drives. In step 1406, the DARS creates an Unprotected Space Table in embodiments that support partial protection. In step 1407, the DARS creates a Protected Space Redirection Table. In step 1408, the DARS maps the available storage space in the Available Space Table to initialize the AST. In step 1409, the DARS maps unprotected space in the Unprotected Space Table to initialize the UST. For each storage device that is part of the computer system, steps 1408 and 1409 are performed. In one embodiment, a single set of DARS tables is used. In an alternative embodiment, a separate set of DARS tables is provided for each storage device in the system. Available space may be determined by any of a number of methods, for example, by querying the appropriate level device driver, by reading the FAT tables directly, by consulting a file containing addresses of such areas, accessing an access control list maintained by the operating system, or querying the user. The addresses that correspond to the unprotected space and protected space are determined from the input received after determining the desired protection level (step 1401). In step 1410, the system registers the Redirection Driver with the operating system as required by that system. For example, in systems running a Windows 9x operating system, any driver stored in the appropriate directory is loaded and put in the correct location to intercept access requests when the system boots. In systems running other operating systems, a different registration process may be required.

In an alternate embodiment of the invention, a user may specify a computer system protection level that allows modifications to be maintained across several system reboots. In step 1403, if the determined protection level indicates that the Available Space Table, Protected Space Redirection Table, and, optionally, the Unprotected Space Table are to be retrieved from a previous session, then the DARS proceeds to step 1404. In step 1404, the DARS loads the existing tables, preferably from persistent memory into volatile memory, and then proceeds to step 1410 where the Redirection Driver is registered to intercept disk access requests, as described above.

Figure 15:
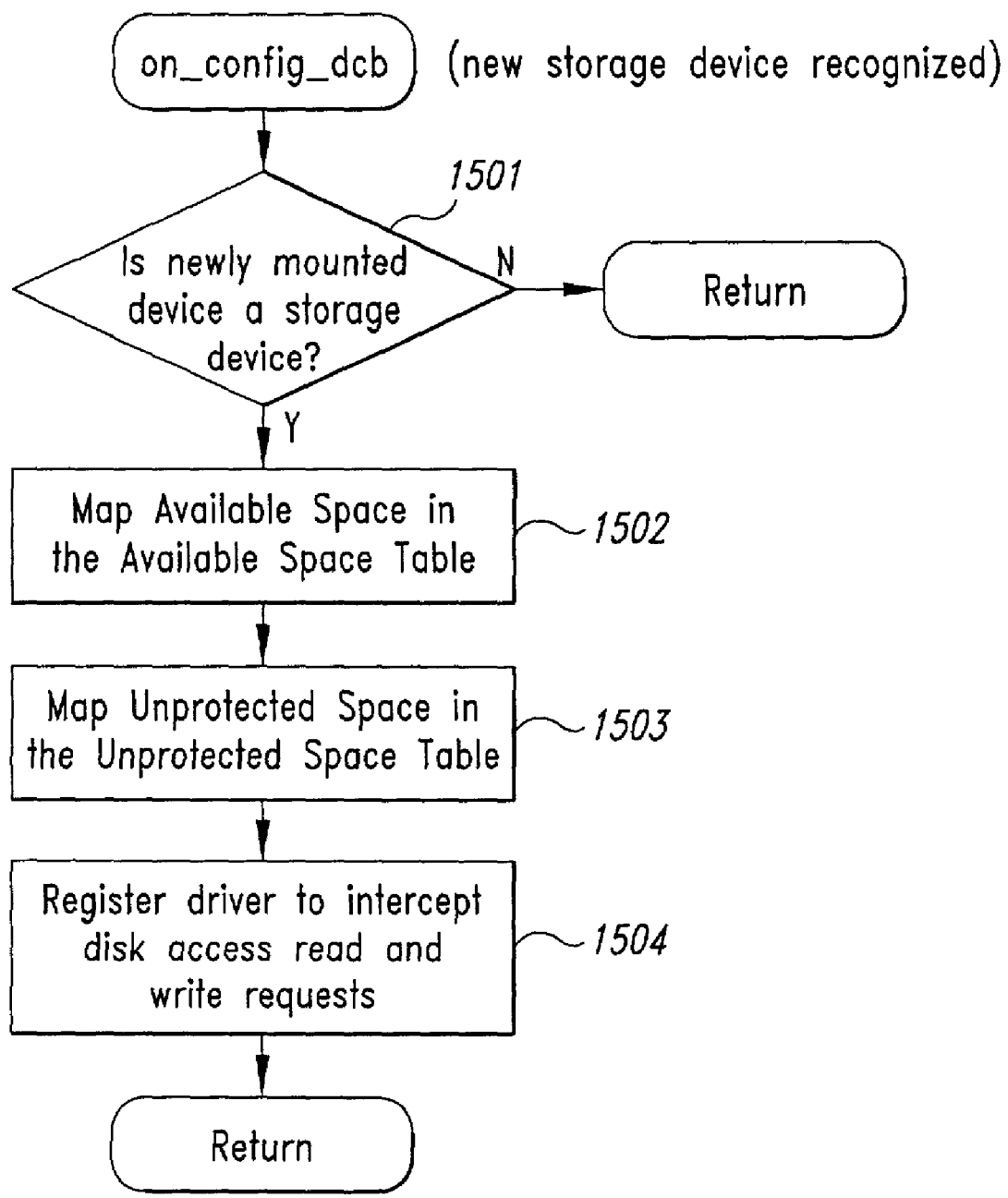
FIG. 15 is an example flow diagram of the steps performed by the Disk Access Redirection System when a new device is mounted by the computer system.

FIG. 15 is an example flow diagram of the steps performed by the Disk Access Redirection System when a new device is mounted by the computer system. In step 1501, the DARS determines whether or not the newly mounted device is a storage device, and, if not, it terminates, else it continues in step 1502. Steps 1502 and 1503 are similar to steps 1408 and 1409, respectively, described above. In step 1502, the DARS maps the available space in the Available Space Table. In step 1503, the DARS maps any designated unprotected space in the Unprotected Space Table. In one embodiment, a user interface may need to be presented to query the user as to whether it is desired to protect this new device (for example, when partial protection has been indicated). In step 1504, when the operating system so requires, the Redirection Driver is registered to intercept read and write requests to the new storage device.

Figure 16:
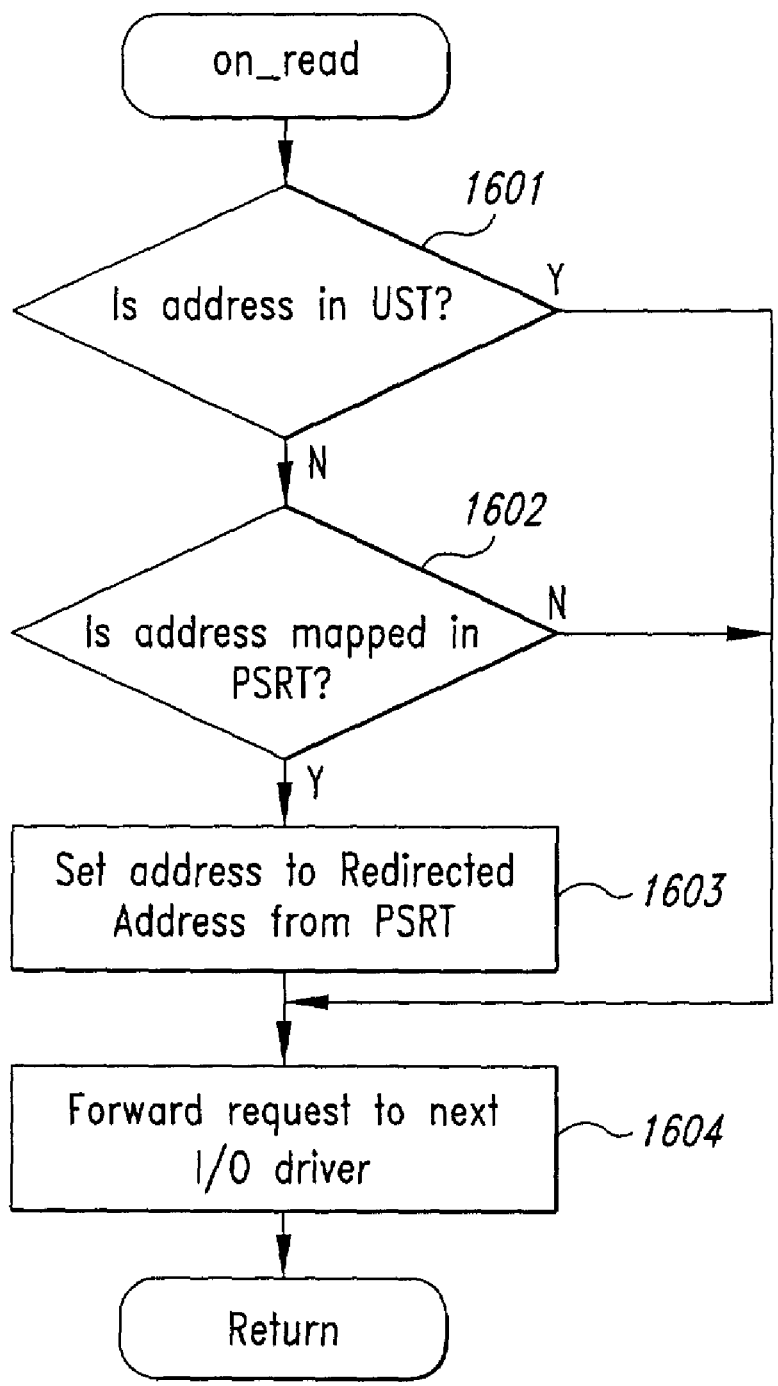
FIG. 16 is an example flow diagram of the steps performed by the Redirection Driver when a read request is intercepted.

FIG. 16 is an example flow diagram of the steps performed by the Redirection Driver when a read request is intercepted. In step 1601, the driver determines whether the requested address is in the UST, indicating unprotected space that may be freely written to and read from. If so, then the driver proceeds to step 1604 to read from the requested address, else, it proceeds to step 1602. In step 1602, the driver determines whether or not the requested address is mapped in the PSRT, indicating that the protected space already has been redirected and the redirected address needs to be read from instead of the original address. If the requested address has been redirected, then the driver continues in step 1603, else, it continues in step 1604. In step 1603, the driver sets the address to the redirected address already mapped in the PSRT. In step 1604, the system forwards the read request, with either the original or redirected address, to the next I/O driver in the driver chain to perform the read.

Figure 17:
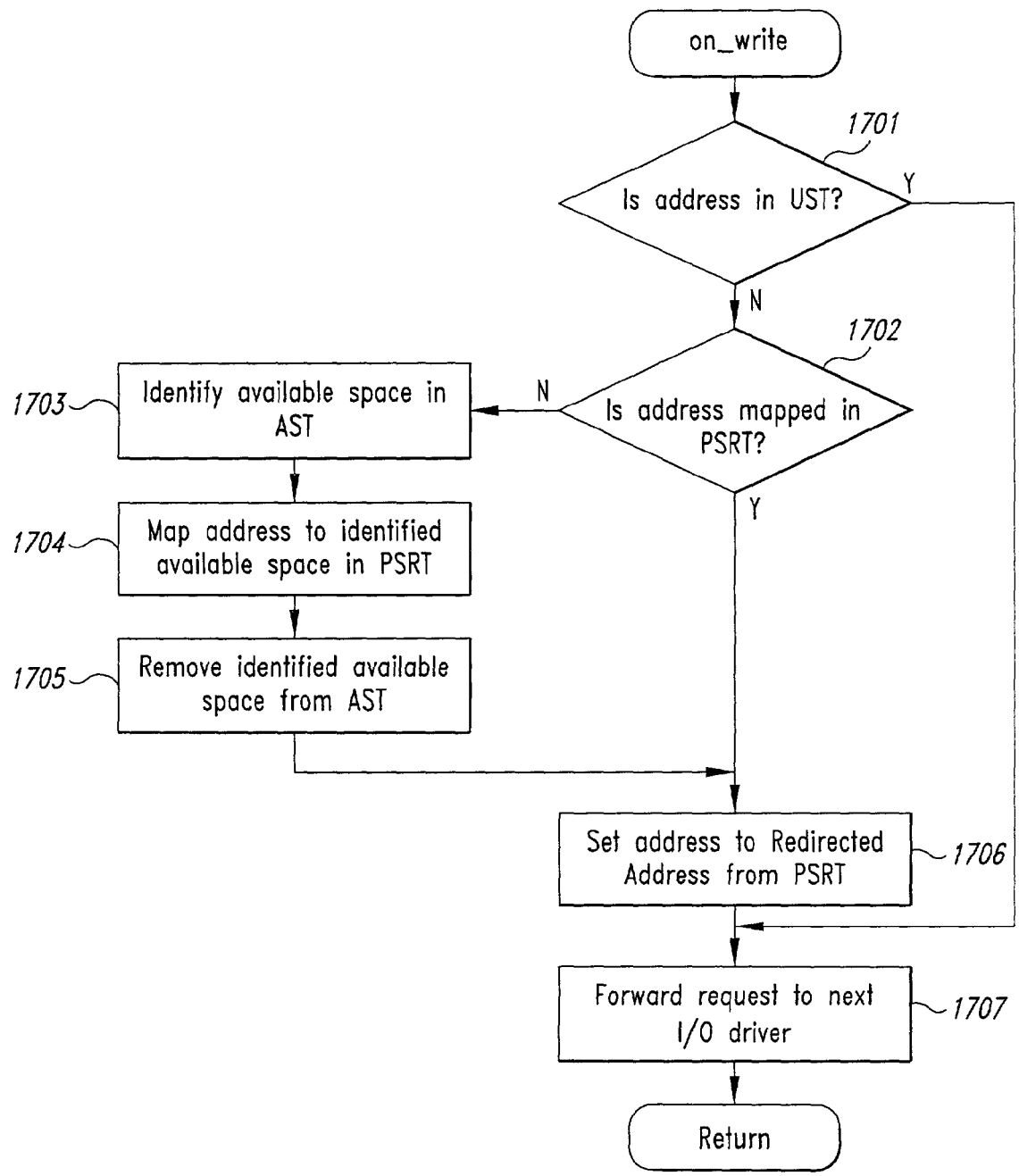
FIG. 17 is an example flow diagram of the steps performed by the Redirection Driver when a write request is intercepted.

FIG. 17 is an example flow diagram of the steps performed by the Redirection Driver when a write request is intercepted. In step 1701, the driver determines whether or not the requested address is in the UST, indicating unprotected space that may be freely written to. If so, then the driver continues in step 1707 to write to the requested address, else it continues in step 1702. In step 1702, the driver determines whether or not the requested address is mapped in the PSRT, indicating that the protected space already has been redirected. If the requested address has not yet been redirected, then the driver continues in step 1703, else it continues in step 1706 to retrieve the redirected address. In step 1703, the driver identifies and allocates available space from the AST as required to satisfy the request. The original write request is progressively broken up into smaller requests, if a large enough space is unavailable to satisfy the request. In step 1704, the driver writes a new record to the PSRT, mapping the requested protected address to the available address allocated from the AST in step 1703. In step 1705, the driver removes the allocated space from the AST, because, once the available space is used as redirected space, it is no longer available. In step 1706, the driver sets the address requested in the disk access request to the redirected address as mapped in the PSRT. In step 1707, the driver forwards the write request with the original unprotected or redirected address to a lower level disk driver to perform the write.

Figure 18:
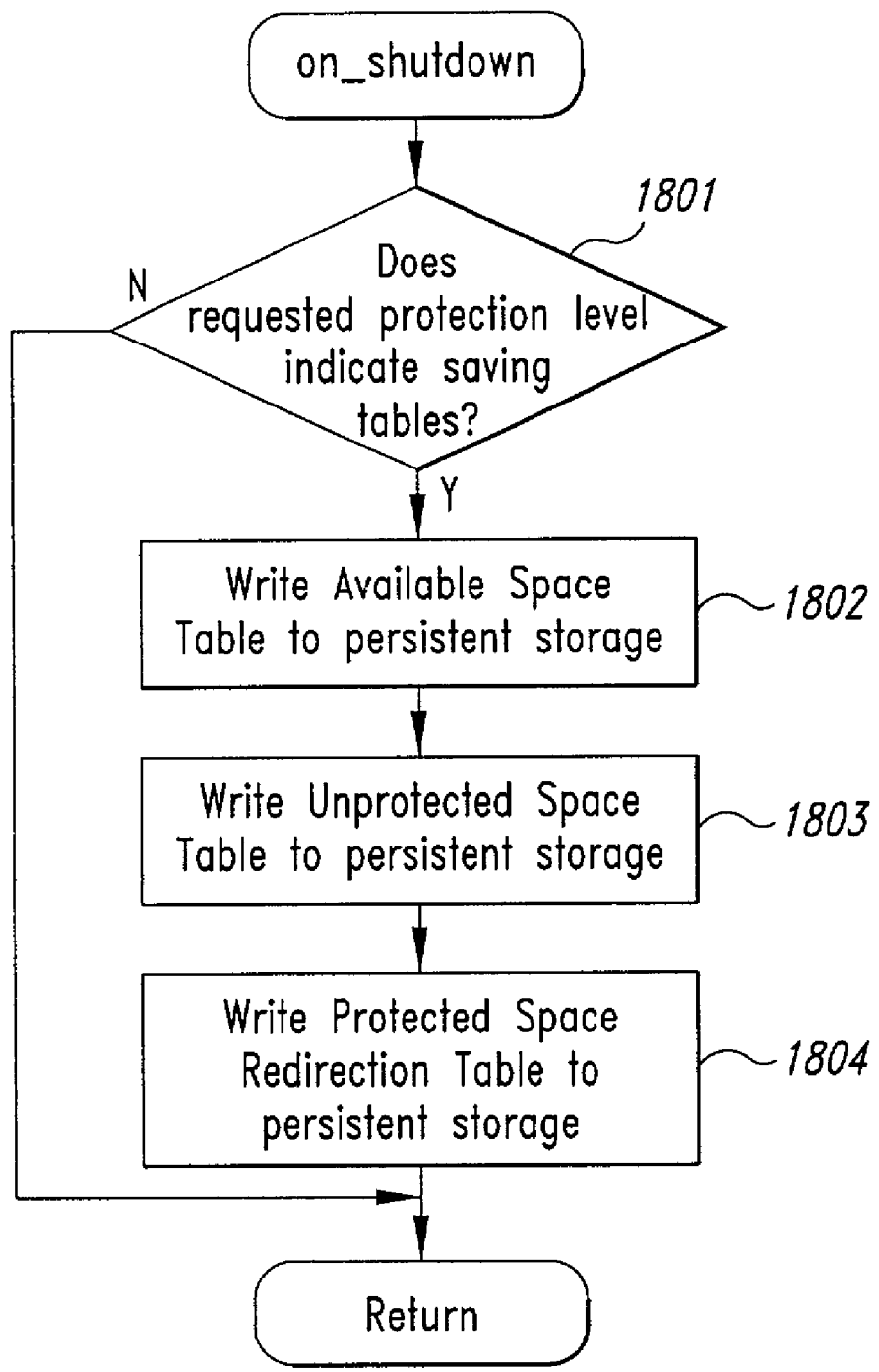
FIG. 18 is an example flow diagram of the steps performed by the Redirection Driver when a system shutdown request is intercepted.

As described above, in an alternate embodiment of the DARS, protection levels are implemented that allow modifications to the redirected space to remain persistent across one or more system reboots. In one such embodiment, the standard driver entry point for system shutdown is implemented in the Redirection Driver. FIG. 18 is an example flow diagram of the steps performed by the Redirection Driver when a system shutdown request is intercepted. In step 1801, the driver determines whether or not the protection level in effect for the computer system indicates saving the DARS tables. If so, then the driver continues in step 1802, else, the on_shutdown routine terminates. In step 1802, the driver writes the Available Space Table to persistent storage. In step 1803, the driver writes the Unprotected Space Table to persistent storage. In step 1804, the driver writes the Protected Space Redirection Table to persistent storage. Persistent storage for these purposes may also be a logical drive in the file system that has been designated as unprotected storage, as described above. One skilled in the art will recognize that other steps may be performed on computer system shutdown in this routine, for example, to store unprotected areas if these had been redirected to redirected space instead of written to directly by the appropriate driver.

Although specific embodiments of, and examples for, the present invention are described herein for illustrative purposes, it is not intended that the invention be limited to these embodiments. Equivalent methods, structures, processes, steps, and other modifications within the spirit of the invention fall within the scope of the invention. For example, the teachings provided herein of the present invention can be applied to any systems with associated persistent data storage, for example, a personal computer system with a hard disk drive, or a networked server system with remote data repositories. In addition, the teachings may be applied to other types of systems where driver-like code may be implemented to redirect the flow of data through the system. These and other changes may be made to the invention in light of the above-detailed description. Accordingly, the invention is not limited by the disclosure, but instead, the scope of the present invention is to be determined by the following claims.

The invention claimed is:

1. A method in a computer system for automatically protecting data stored in a portion of a storage device having a designated protected space, the computer system having a designated unprotected space and a redirected space, comprising:

loading a software redirection driver into an input/output driver hierarchy loaded in a volatile memory of the computer system during power-up initialization, wherein the software redirection driver is an input/output driver; and under control of code of the loaded software redirection driver, redirecting input/output requests by:

intercepting from requesting code that is external to the loaded software redirection driver a request to modify a location in the protected space or a location in the unprotected space;

when the request is to modify a location in the unprotected space, initiating modification of the location in the unprotected space without redirection;

when the request is to modify a location in the protected space, determining a location in the redirected space that is associated with the location in the protected space; and redirecting the intercepted request to modify the determined location in the redirected space instead of the location in the protected space;

in response to a request to shutdown the computer system, disregarding the data in the redirected space;

after the disregarding of the data in the redirected space, intercepting from requesting code a request to read the location in the protected space; and in response to the intercepting of the request to read the location in the protected space, providing data from the location in the protected space instead of providing data from the redirected space, so that the data stored in the location in the protected space automatically remains unaltered when the computer system is restarted from a powered-down state.

2. The method of claim 1 wherein a redirection driver performs the intercepting the request, determining the location in the redirected space, and redirecting the intercepted request.

3. The method of claim 2 wherein the driver is inserted into a driver hierarchy that is controlled by an operating system of the computer system.

4. The method of claim 1 wherein the designated protected space of the storage device comprises the entire storage device.

5. The method of claim 1 wherein the determined location in the redirected space resides in the storage device.

6. The method of claim 1 wherein the determined location in the redirected space resides in an other storage device.

7. The method of claim 1, further comprising:

intercepting from requesting code a request to read the location in the protected space of the storage device;

determining the location in the redirected space that is associated with the location in the protected space; and automatically redirecting the intercepted request to read from the determined location in the redirected space instead of from the location in the protected space in a manner that is transparent to the requesting code.

8. The method of claim 1 wherein the request to modify the location in the protected space is a request to write to the protected space.

9. The method of claim 8 wherein the redirecting the intercepted write request results in automatically allocating available space to use as new redirected space and writing data to a location in the new redirected space.

10. The method of claim 1 wherein the determining the location in the redirected space that is associated with the location in the protected space further comprises first allocating available space to be used as the redirected space.

11. The method of claim 1 wherein the storage device is one of a hard disk drive, a read/write CD ROM drive, a floppy disk drive, or a semi-persistent storage device.

12. The method of claim 1 wherein the location in the protected space refers to at least one of a sector, a group of sectors, a cluster, or a group of clusters.

13. The method of claim 1 wherein the location in the redirected space refers to at least one of a sector, a group of sectors, a cluster, a group of clusters, a virtual cluster, or a group of virtual clusters.

14. The method of claim 13 wherein the sector is a logical sector.

15. The method of claim 13 wherein the sector is a physical sector.

16. The method of claim 13 wherein the location in the protected space refers to a sector.

17. The method of claim 13 wherein the location in the protected space refers to an abstraction of storage that is larger than a sector.

18. The method of claim 1 wherein the redirected space is organized according to a combination of different storage abstractions.

19. The method of claim 18 wherein a portion of the redirected space is organized as one of virtual clusters, clusters, files, and sectors, and an other portion is organized according to a different storage abstraction.

20. The method of claim 1 wherein the disregarding of the data in the redirected space comprises at least one of deleting the data from the storage in the redirected space, disassociating the redirected space from the protected space, or ignoring the data in the redirected space.

21. The method of claim 1, further comprising using redirection tables to associate locations in the protected space to locations in the redirected space.

22. The method of claim 21 wherein the redirection tables comprise at least one of a protected space redirection table, an available space table, or an unprotected space table.

23. A computer-readable memory medium containing program code that controls a computer processor to protect data stored in a portion of a storage device having a designated protected space, the computer system having a designated unprotected space and a redirected space, by performing a method comprising:

loading a software redirection driver into an input/output driver hierarchy loaded in a volatile memory of the computer system during power-up initialization, wherein the software redirection driver is an input/output driver; and under control of code of the loaded software redirection driver, redirecting input/output requests by:

intercepting from requesting code that is external to the loaded software redirection driver a request to modify a location in the protected space or a location in the unprotected space;

when the request is to modify a location in the unprotected space, initiating modification of the location in the unprotected space without redirection; and when the request is to modify a location in the protected space, determining a location in the redirected space that is associated with the location in the protected space; and redirecting the intercepted request to modify the determined location in the redirected space instead of the location in the protected space, in response to a request to shutdown the computer system, disregarding the data in the redirected space; after the disregarding of the data in the redirected space, intercepting from requesting code a request to read the location in the protected space; and in response to the intercepting of the request to read the location in the unprotected space, providing data from the location in the protected space instead of providing data from the redirected space, so that the data stored in the location in the protected space automatically remains unaltered when the computer system is restarted from a powered-down state.

24. The computer-readable memory medium of claim 23 wherein the designated protected space of the storage device comprises the entire storage device.

25. The computer-readable memory medium of claim 23 wherein the determined location in the redirected space resides in the storage device.

26. The computer-readable memory medium of claim 23 wherein the determined location in the redirected space resides in an other storage device.

27. The computer-readable memory medium of claim 23, the method further comprising:
  prior to the disregarding of the data in the redirected space,
    intercepting from requesting code a request to read the location in the protected space of the storage device;
    determining the location in the redirected space that is associated with the location in the protected space; and
    automatically redirecting the intercepted request to read from the determined location in the redirected space instead of from the location in the protected space in a manner that is transparent to the requesting code.

28. The computer-readable memory medium of claim 23 wherein the request to modify the location in the protected space is a request to write to the protected space that results in automatically writing data to the determined location in the redirected space instead of to the location in the protected space.

29. The computer-readable memory medium of claim 28 wherein the redirecting the intercepted write request results in automatically allocating available space to use as new redirected space and writing data to a location in the new redirected space.

30. The computer-readable memory medium of claim 23 wherein the determining the location in the redirected space that is associated with the location in the protected space further comprises first allocating available space to be used as the redirected space.

31. The computer-readable memory medium of claim 23 wherein the storage device comprises one of a hard disk drive, a read/write CD ROM drive, a floppy disk drive, or a semi-persistent storage device.

32. The computer-readable memory medium of claim 23 wherein the location in the protected space refers to at least one of a sector, a group of sectors, a cluster, or a group of clusters.

33. The computer-readable memory medium of claim 23 wherein the location in the redirected space refers to at least one of a sector, a group of sectors, a cluster, a group of clusters, a virtual cluster, or a group of virtual clusters.

34. The computer-readable memory medium of claim 33 wherein the location in the protected space refers to a sector.

35. The computer-readable memory medium of claim 33 wherein the location in the protected space refers to an abstraction of storage that is larger than a sector.

36. The computer-readable memory medium of claim 23 wherein the redirected space is organized according to a combination of different storage abstractions.

37. The computer-readable memory medium of claim 36 wherein a portion of the redirected space is organized as at least one of virtual clusters, clusters, files, and sectors, and an other portion is organized according to a different storage abstraction.

38. The computer-readable memory medium of claim 23 wherein disregarding the data in the redirected space comprises at least one of deleting the data from the storage in the redirected space, disassociating the redirected space from the protected space, or ignoring the data in the redirected space.

39. The computer-readable memory medium of claim 23, further comprising using redirection tables to associate locations in the protected space to locations in the redirected space.

40. A computer system for automatically protecting data stored in a portion of a storage device, comprising:
  a protected space on the storage device for storing the protected data;
  an unprotected space;
  redirected storage space in the computer system designated for storing attempted modifications of the protected data; and
  a software redirection driver that redirects input/output requests, loaded into an input/output driver hierarchy loaded in a volatile memory of the computer system when the system is booted from a powered-down state, wherein the software redirection driver is an input/output driver including code that, when executed, is configured to:
  intercept from requesting code that is external to the software redirection driver a request to modify a location in the protected space or a location in the unprotected space;
  when the request is to modify a location in the unprotected space, initiate modification of the location in the unprotected space without redirection;
  when it is determined that the request is to modify a location in the protected space, redirect the request so that the request results in modifying a location in the redirected storage space instead of the location in the protected space;
  in response to a request to shutdown the computer system, disregarding the data in the redirected space;
  after the disregarding of the data in the redirected storage space, intercepting from the requesting code a request to read the location in the protected space; and
  in response to the intercepting of the request to read the location in the protected space, providing data from the location in the protected space instead of providing data from the redirected space, so that the location in the protected space automatically remains unaltered when the computer system is restarted from a powered-down state.

41. The computer system of claim 40, further comprising a redirection table that maps locations in the protected space to locations in the redirected storage space, and is used by the redirection driver to determine a location in the redirected storage space to use for redirecting an intercepted request.

42. The computer system of claim 41 wherein the contents of the redirection table are saved by the computer system when the computer system is powered down.

43. The computer system of claim 40 wherein the protected space comprises the entire storage device and the redirected storage space is not located on the storage device.

44. The computer system of claim 40 wherein the redirected storage space is located on the storage device.

45. The computer system of claim 40 wherein an intercepted and redirected access request is a request to read from a location in the protected space.

46. The computer system of claim 40 wherein an intercepted and redirected access request is a request to write to a location in the protected space that is redirected to modify a location in the redirected space.

47. The computer system of claim 40 wherein the storage device is one of a hard disk drive, a read/write CD ROM drive, a floppy disk drive, or a semi-persistent storage device.

48. The computer system of claim 40 wherein the redirection driver refers to the redirected storage space in at least one of files, clusters, virtual clusters, or sectors of data.

49. The computer system of claim 40 wherein the redirection driver refers to the redirected storage space using multiple data addressing abstractions.

50. The computer system of claim 40 wherein the redirection driver implements a virtual cluster data abstraction.

51. The computer system of claim 40 wherein the redirection driver is loaded by inserting the redirection driver into a chain of drivers so that it is automatically invoked by the computer system.

52. The computer system of claim 40, further comprising an unprotected space table for tracking the locations of the storage device that are designated as unprotected space.

53. The computer system of claim 40 wherein the contents of the redirected storage space are saved by the computer system when the computer system is powered down.

54. A method for protecting data in a storage device of a computer system having an operating system, a device driver, an unprotected space, and a storage device having a designated protected space, comprising:
    loading a software redirection driver into a volatile memory of the computer system during power-up initialization;
    installing the software redirection driver before the device driver in a calling sequence of the operating system, so that the operating system invokes the redirection driver in response to receiving a request to access the storage device;
    under control of the redirection driver,
    intercepting from requesting code that is external to the redirection driver a request to modify a location referred to by a protected space redirection table or a location referred to by an unprotected space table;
    when the request is to modify a location referred to by the unprotected space table, initiating modification of the location in the unprotected space without redirection; and
    when the request is to modify a location referred to by the protected space redirection table, redirecting the request to modify a location in unused storage associated with the location referred to by the protected space redirection table, such that the data in the location in the protected space remains unaltered;
    in response to a request to shutdown the computer system, disregarding data in the location in the unused storage;
    after the disregarding of the data in the location in the unused storage, intercepting from the requesting code a request to read the location in the protected space; and
    in response to the intercepting of the request to read the location in the protected space, providing data from the location in protected space instead of providing data from the location in the unused storage, so that the data stored in the location in the protected space automatically remains unaltered when the computer system is restarted from a powered-down state.

55. The method of claim 54 wherein the redirection driver cannot be uninstalled by a user without special access privileges, thereby forcing the data to be securely maintained.

56. The method of claim 54, the device driver comprising one of a plurality of device drivers that are arranged in a layered fashion, and wherein the redirection driver is installed between two of these device drivers.

57. The method of claim 56 wherein each driver layer comprises a driver that communicates with an associated device according to different data abstraction; and wherein the redirection driver can be configured to be installed at different layers depending upon the data abstraction implemented by the redirection driver.

58. The method of claim 54 wherein the redirection driver handles blocks of data defined as at least one of virtual clusters, clusters, sectors, or files.

59. The method of claim 54 wherein the redirection driver handles multiple different data abstractions.

60. The method of claim 54 wherein the computer system comprises redirection tables that are maintained by the redirection driver to manage associations between data that has been redirected by redirecting the request to the location in unused storage and unaltered data stored on the storage device.

61. A storage access redirection system for protecting data in designated locations on a storage device in a computer system, comprising:
    an available space table;
    a protected space redirection table that is used to designate protected locations on the storage device that are to be protected from modification;
    an unprotected space table that is used to designate unprotected locations on the storage device that can be altered, wherein the available space table, the protected space redirection table, and the unprotected space table are separate and distinct from each other; and
    a software redirection driver, installed in a volatile memory of the computer system upon power-up initialization, that when executed, is configured to:
    automatically intercept a request to modify one of the designated protected locations or to modify a location referred to by the unprotected space table;
    when the request is to modify a location referred to by the unprotected space table, disregard the request so that data in the location referred to by the unprotected space table is modified according to the request;
    when the request is to modify one of the designated protected locations,
    use the protected space redirection table to determine whether the designated protected location has been previously redirected;
    when it is determined that the designated protected location has been previously redirected,
    determine an associated redirected location referred to by the protected space redirection table; and
    redirect the request to the associated redirected location; and
    when it is determined that the designated protected location has not been previously redirected,
    allocate a new redirected location based on the available space table;
    redirect the request to modify one of the designated protected locations to the new redirected location;
    record a reference to the new redirected location in the protected space redirection table; and
    remove the reference to the new redirected location from the available space table; and
    in response to a request to shutdown the computer system, disregarding the data in the protected space redirection table;
    after the disregarding of the data in the protected space redirection table, intercepting from requesting code a request to read the one of the desginated protected locations on the storage devices; and in response to the intercepting of the request to read the one of the designated locations, providing data from the one of the designated protected locations on the storage device instead of providing data from a location referred to by the protected space redirection table, so that the data stored in the one of the designated protected locations on the storage device automatically remains unaltered when the computer system is restarted from a powered-down state.

62. The storage access redirection system of claim 61 wherein the redirection driver receives a request to read one of the designated locations and redirects the read request to an associated redirected location when it is determined that the designated location has been previously redirected.

63. A method in a computer system for automatically protecting data stored in a portion of a storage device having a designated protected space, the computer system having a designated unprotected space and a redirected space, comprising:

loading a software redirection driver into an input/output driver hierarchy loaded in a volatile memory of the computer system during power-up initialization, wherein the software redirection driver is an input/output driver; and under control of code of the loaded software redirection driver, redirecting input/output requests by:

intercepting from requesting code that is external to the loaded software redirection driver a request to modify a location in protected space referred to by a protected space redirection table or a location in unprotected space referred to by an unprotected space table;

when the request is to modify a location in unprotected space referred to by the unprotected space table, initiating modification of the location in the unprotected space without redirection;

when the request is to modify a location in protected space referred to by the protected space redirection table, determining, based on the protected space redirection table, a location in the redirected space that is mapped to the location in the protected space;

redirecting the intercepted request to modify the determined location in the redirected space instead of the location in the protected space;

in response to a request to shutdown the comruter system, disregarding the data in the redirected space:

after the disregarding of the data in the redirected space, intercepting from requesting code a request to read the location in the protected space; and in response to the intercepting of the request to read the location in the protected space, providing data from the location in the protected space instead of providing data from the redirected space, so that the data stored in the location in the protected space automatically remains unaltered when the computer system is restarted from a powered-down state.

64. The method of claim 63 further comprising:

when the request has not been previously redirected, allocating the location in the redirected space based on an available space table; and recording in the protected space redirection table a reference to the location in the redirected space.

65. The method of claim 63 wherein the redirected space table maps locations in the protected space to locations in the redirected space.

66. The method of claim 65 wherein the locations in the protected space include at least one of a file, a sector, or a cluster.

67. The method of claim 63 wherein the unprotected space table includes indications of unprotected locations on the storage device.

68. The method of claim 67 wherein the unprotected locations include at least one of a file, a sector, or a cluster.

69. The method of claim 63 wherein the driver is inserted into a driver hierarchy that is controlled by an operating system of the computer system.

70. The method of claim 63 wherein the request to modify the location is a request to write a location in the protected space.

71. The method of claim 63 wherein at least one of the protected space, the unprotected space, or the redirected space are organized according to multiple storage abstractions.

72. A computer-readable memory medium containing program code that controls a computer processor to protect data stored in a portion of a storage device having a designated protected space, the computer system having a designated unprotected space and a redirected space, by performing a method comprising:

loading a software redirection driver into an input/output driver hierarchy loaded in a volatile memory of the computer system during power-up initialization, wherein the software redirection driver is an input/output driver; and under control of code of the loaded software redirection driver, redirecting input/output requests by:

intercepting from requesting code that is external to the loaded software redirection driver a request to modify a location in protected space referred to by a protected space redirection table or a location in unprotected space referred to by an unprotected space table;

when the request is to modify a location in unprotected space referred to by the unprotected space table, initiating modification of the location in the unprotected space without redirection;

when the request is to modify a location in protected space referred to by the protected space redirection table, determining, based on the protected space redirection table, a location in the redirected space that is mapped to the location in the protected space;

redirecting the intercepted request to modify the determined location in the redirected space instead of the location in the protected space;

in response to a request to shutdown the computer system, disregarding the data in the redirected space:

after the disregarding of the data in the redirected space, intercepting from requesting code a request to read the location in the protected space; and in response to the intercepting of the request to read the location in the protected space, providing data from the location in the protected space instead of providing data from the redirected space, so that the data stored in the location in the protected space automatically remains unaltered when the computer system is restarted from a powered-down state.

73. The computer-readable memory medium of claim 72 wherein the method further comprises:

when the request has not been previously redirected, allocating the location in the redirected space based on an available space table; and recording in the protected space redirection table a reference to the location in the redirected space.

74. The computer-readable memory medium of claim 72 wherein the redirected space table maps locations in the protected space to locations in the redirected space.

75. The computer-readable memory medium of claim 74 wherein the locations in the protected space include at least one of a file, a sector, or a cluster.

76. The computer-readable memory medium of claim 72 wherein the unprotected space table includes indications of unprotected locations on the storage device.

77. The computer-readable memory medium of claim 76 wherein the unprotected locations include at least one of a file, a sector, or a cluster.

78. The computer-readable memory medium of claim 72 wherein the driver is inserted into a driver hierarchy that is controlled by an operating system of the computer system.

79. The computer-readable memory medium of claim 72 wherein the request to modify the location is a request to write a location in the protected space.

80. The computer-readable memory medium of claim 72 wherein at least one of the protected space, the unprotected space, or the redirected space are organized according to multiple different storage abstractions.

* * * * *